(12) United States Patent
Rothchild et al.

(10) Patent No.: US 11,388,185 B1
(45) Date of Patent: Jul. 12, 2022

(54) METHODS, SYSTEMS AND COMPUTING PLATFORMS FOR EVALUATING AND IMPLEMENTING REGULATORY AND COMPLIANCE STANDARDS

(71) Applicant: IronBench, L.L.C., Clive, IA (US)

(72) Inventors: Brenton Rothchild, Indianola, IA (US); Matthew D. Edwards, Des Moines, IA (US); Brandon Ratzlaff, Olathe, KS (US); Nick Christus, Kansas City, MO (US); Ben Kiefer, Windsor Heights, IA (US); Alex Hart, Bozeman, MT (US); Nathan Gibson, New Virginia, IA (US)

(73) Assignee: IronBench, L.L.C., Clive, IA (US)

( * ) Notice: Subject to any disclaimer, the term of this patent is extended or adjusted under 35 U.S.C. 154(b) by 450 days.

(21) Appl. No.: 16/731,411

(22) Filed: Dec. 31, 2019

Related U.S. Application Data

(60) Provisional application No. 62/786,742, filed on Dec. 31, 2018.

(51) Int. Cl.
*H04L 9/40* (2022.01)
*H04L 41/02* (2022.01)
*G06F 9/54* (2006.01)
*G09B 7/02* (2006.01)

(52) U.S. Cl.
CPC ............ *H04L 63/1433* (2013.01); *G06F 9/54* (2013.01); *G09B 7/02* (2013.01); *H04L 41/02* (2013.01); *H04L 63/20* (2013.01)

(58) Field of Classification Search
CPC .............. H04L 9/40; H04L 41/02; G06F 9/54
See application file for complete search history.

(56) References Cited

U.S. PATENT DOCUMENTS

| | | | | |
|---|---|---|---|---|
| 8,401,893 | B1* | 3/2013 | Heuler | G06Q 10/06 705/7.41 |
| 8,959,568 | B2* | 2/2015 | Hudis | G06F 21/577 726/1 |
| 9,898,769 | B2* | 2/2018 | Barday | G06Q 10/063114 |
| 9,912,686 | B2* | 3/2018 | Mahabir | H04L 63/0428 |
| 9,930,062 | B1* | 3/2018 | Alkemper | G06F 21/577 |
| 10,346,598 | B2* | 7/2019 | Barday | G06F 21/316 |

(Continued)

OTHER PUBLICATIONS

Cheatem, "Putting safety first with integrated Audit, Risk and Control Management" Mar. 2019, 3 pages.

(Continued)

*Primary Examiner* — Viral S Lakhia
(74) *Attorney, Agent, or Firm* — Goodhue, Coleman & Owens, P.C.

(57) ABSTRACT

A method of performing an online assessment of compliance with cyber-security risk and information security risk standards, comprising the steps of providing access to a user to a compliance navigator software tool, the compliance navigator software tool comprising a content management system an assessment module, an access control module, an audit module, and an automated testing module, presenting a plurality of assessment questions to the user by executing the assessment module, assessing answers to the plurality of assessment questions using the assessment module, the assessment module comprising machine-readable instructions stored on the non-transitory machine-readable storage medium, and displaying results of the assessment to the user.

10 Claims, 29 Drawing Sheets

(56) References Cited

U.S. PATENT DOCUMENTS

| | | | |
|---|---|---|---|
| 11,120,380 B1* | 9/2021 | Narala | G06F 16/2458 |
| 2017/0287034 A1* | 10/2017 | Barday | G06Q 10/0635 |
| 2019/0272492 A1* | 9/2019 | Elledge | G06Q 10/0635 |
| 2020/0134227 A1* | 4/2020 | Joseph | G06F 3/14 |
| 2021/0084057 A1* | 3/2021 | Ch | H04L 63/1416 |

OTHER PUBLICATIONS

HypoVereinsbank, "Enhances risk and controls management, unlocking savings and improving processes," Dec. 2017, 4 pages.

Ironbench, "IronBench Cloud Config Product Overview", 2018, "https://ironbench.zendesk.com/hc/en-us/articles/360015201791-Cloud-Config-Product-Overview", 3 pages.

Ironbench, "IronBench Compliance Navigator Product Overview," 2019, "https://ironbench.zendesk.com/hc/en-us/articles/360014997632-Compliance-Navigator-Product-Overview", 3 pages.

Ironbench, "Welcome to IronBench," "https://blog.ironbench.io/welcome-to-ironbench/", Jul. 20, 2017, 2 pages.

MetricStream, "GRC Insight", 2019, "https://www.metricstream.com/library/grcinsight/all," 3 pages.

MetricStream, "Solutions", 2019, "https://www.metricstream.com/solutions/index.htm", 5 pages.

Murphy et al., "GRC Vision, 2019-2024 Vision: The Governance, Risk, And Compliance Playbook," Jan. 25, 2019, 11 pages.

Queutey-Baltazard, "A global reinsurer increases user engagement to bolster risk mitigation," Dec. 2019, 3 pages.

Reciprocity, "Replace time consuming risk management and compliance processes," 2012, 7 pages, "https://reciprocitylabs.com/product/".

Rsa, "Automate, Integrate, Manage & Report Across Your Enterprise," Jan. 2018, 4 pages.

RSAM Itgrcbond "Software designed for effective IT Risk & Compliance management," 2019, 1 page.

Symantec, "Symantec Advanced Threat Protection: What we learned as the first and best customer of Symantec ATP," 2016, 5 pages,.

Symantec, "Symantec Control Compliance Suite 12.5", 2019, 3 pages.

Symantec, "Uncover, prioritize, and remediate today's most advanced attacks," 2015, 9 pages.

Telos, "Manage the complexity of risk management and compliance", 2019, 2 pages.

Telos, "Solutions and Services for Cybersecurity Assurance," 2019, 2 pages.

Telos, "The solution you need to continuous cyber risk management. The evidence you need ongoing security compliance," 2019, 2 pages.

Telos, "Welcome to the Future of IT Security and Risk Management," 2019, 2 pages.

Telos, "Xacta 360 for NIST CSF and SP 800-171," 2019, 2 pages.

Telos, "Xacta 360: The solution for Streamlining and automating adherence with the leading cyber risk management framework," 2019, 2 pages.

Telos, "Xacta: The enterprise solution for cyber risk management and compliance automation," 2019, 2 pages.

Zhang et al, "Magic Quadrant for Integrated Risk Management Solutions," Jul. 15, 2019, 27 pages.

* cited by examiner

FIG. 5A

IRONBENCH
IronBench Compliance Navigator™ Maturity Assessment

Systems

\* How do you deliver software ?
- ○ Updates to software are done manually on as-needed basis
- ○ Updates to software are done through an automated process
- ○ Updates to software are done automatically with every change, after rigorous tests are applied
- ○ We don't deliver software, or I don't know \* How do you approach penetration testing?
- ☐ We use automated software to perform penetration testing
- ☐ We have a security peer review
- ☐ We use a test-driven development framework that includes a penetration test tool on the CI/CD pipeline
- ☐ We utilize internal resources to conduct a manual penetration test of every product at least annually
- ☐ We engage a third party for penetration testing every year
- ☐ We engage a third party for penetration testing every new product launch or every new version of an existing product
- ☐ We don't do this, or I don't know \* How do you prevent new vulnerabilities from being introduced?
- ☐ We do periodic vulnerability scanning
- ☐ We perform peer reviews of software prior to deployment
- ☐ We do vulnerability scanning with every build bundle and deploy package
- ☐ We don't do this, or I don't know \* How do you detect vulnerabilities in your existing systems?
- ☐ We scan the environments for vulnerabilities daily
- ☐ We scan all new code for vulnerabilities at every deployment
- ☐ We regularly have security-trained personnel review deployments for potential vulnerabilities
- ☐ We don't do this, or I don't know \* How do you test your software?
- ☐ We practice test-driven development when we build software
- ☐ Our tests are mapped to security controls appropriate to our internal or external standards
- ☐ Automated testing of the product occurs before every production deployment
- ☐ Manual regression testing of the product occurs before every production deployment
- ☐ We don't do this, or I don't know \* How do you apply network security in the cloud?
- ☐ We utilize VPNs to get the cloud and VPCs to work within the cloud with a "deny by default" system configuration
- ☐ We regularly audit/test our network to ensure compliance with our security standards
- ☐ We use a cloud specialized firewall (such as F5 or Palo Alto)
- ☐ We don't do this, or I don't know \* How do you segment your data and network?
- ☐ We logically separate our environments including, but not limited to: development, test, and production
- ☐ We are looking into de-identifying data for test and development
- ☐ We ban the use of production data in test and development environments
- ☐ We have a flat network, don't do this, or I don't know Previous [ Next ]

FIG. 5B

IR⊛NBENCH

IronBench Compliance Navigator™ Maturity Assessment
Systems

\* Is your data encrypted at rest (when sitting on a server)?
- ○ All data is encrypted at rest
- ○ some data is encrypted at rest
- ○ No data is encrypted at rest
- ○ I don't know \* Is your data encrypted in transit (When moving around within servers and on the network)?
- ○ All data is encrypted in transit
- ○ some data is encrypted in transit
- ○ No data is encrypted in transit
- ○ I don't know \* How do you implement segregation of duties and least privilege?
- ☐ We use separate accounts for administrative privileges on local machines (laptops/desktops)
- ☐ We use separate accounts for administrative privileges on servers
- ☐ We use separate accounts for cloud administration
- ☐ We use separate accounts for each cloud environment
- ☐ We don't do this, or I dont know \* How do you deal with malicious code and / or insider threats?
- ☐ We scan our software for malicious code
- ☐ We have a documented plan in place for what to do when we find malicious code, including how and what we document, how we contain it, and how we analyze and neutralize it
- ☐ We I don't do this, or I dont know \* How would you describe your response plan?
- ○ We have a disaster recovery plan (DRP), with a recovery point objective (RPO) and recovery time objective (RTO), and have tested this plan to meet expectations
- ○ We are currently building a DRP, but it is neither implemented, nor tested
- ○ None of the above, or I dont know \* How do you manage keys and/or secrets?
- ○ We use a third party secrets management tool like Hashicorp vault, Amazon KMS, Azure Secrets Vault
- ○ We use a custom-developed or in-house secrets management tool
- ○ We store secrets in a shared location
- ○ We hard-code secrets where they are used
- ○ None of the above, or I dont know \* Choose the statement that best describes your privacy program.
- ○ We have a privacy policy published on our website
- ○ We have a privacy policy that has been certified by a firm like TrustArc published on our website
- ○ We have a certified privacy policy which shapes all of our business and technology activities published on our website, for example, when creating new functionality we ensure that developers prepare positive and negative tests for privacy impacts that will be run on every new build \* Tell us about your software Development Lifecycle (SDLC).
- ○ We have a written SDLC that all development, feeder, and receiving organizations conform to
- ○ We have a mixture of different development styles that mesh together to help us accomplish our business needs
- ○ None of the above, or I dont know Previous [ Next ]

FIG. 5C

IRONBENCH

IronBench Compliance Navigator™ Maturity Assessment
Systems

* Web Application Firewall
- ○ We utilize a web application firewall that protects us from things like XSS (cross-site scripting), SQL injection, and web session hijacking
- ○ We do not use a web application firewall, or i dont know

* Application programming interface (API) protection
- ○ We follow a "deny by default" system with everything we do
- ○ We utilize a fuzzer to find any endpoints that are potential attack vectors and/ or are to "helpful" to hackers
- ○ We don't have APIs, or i don't know

* Distributed Denial Of Service (DDOS) Protection
- ○ We use CDN, CloudFront, CloudFlare, AWS Shield or similar technologies to mitigate our DDOS exposure
- ○ We have never needed to have a plan for DDOS attack mitigation

* How do you use tokenization?
- ○ We utilize tokenization for session management and/or other critical architectural and functional needs
- ○ it is on our to-do list. We have heard a lot about tokenization. but we are unsure how to use it
- ○ We don't use tokenization presently, nor are looking at it

* How do you review entitlements?
- ☐ We review all entitlements annually
- ☐ We review entitlements when a user changes functions within the company
- ☐ We have supervisors peer review entitlements with a description of why the entitlement is granted
- ☐ Entitlements expire after 90 days or 1 year, based upon sensitivity
- ☐ We have an exit checklist for departing employees, and when an employee gives notice, we revoke all sensitive access
- ☐ We don't do this, or i dont know

* Tell us a bit about how you manage cross-cloud communications.
- ○ We have a plan to manage cross-cloud communications (e.g. Azure to AWS or on-prem to GCP) and have implemented that plan based on least privilege
- ○ We do not presently have planfor cross-cloud comminication

* What do you use for security monitoring and auditing?
- ○ We have a robust auditing and monitoring program. All of our events go into a Security Information and Event Management (SEIM) tool (e.g. splunk) and are analyzed automatically and manually for malicious activity inside and outside our organization
- ○ We currently put log files into a tool, and analyze them when something goes wrong
- ○ We have logs and access to some free tools, but we don't really use them that often. we know where it is when we need it
- ○ We don't do this, or i dont know

* How do you handle security Exception and/ or variances?
- ○ We have a process for when we dont use best practices. For example, we record the variation from standard and put a time to remediation in place that is approved by a senior leader
- ○ We have some deviations from best practices that we are aware of, but right now that's technical debt We aren't currently concerned about, nor are we planning to address it anytime soon
- ○ We inherited some software and haven't reviewed it again our standards or for best practices
- ○ We don't do this, or i dont know Previous  [ Next ]

FIG. 5D

IR⊙NBENCH

IronBench Compliance Navigator™ Maturity Assessment
Systems

\* Where are your servers?
○ Data center
○ Servers are on the premises in a dedicated space
○ Some servers in the cloud, and some on premises
○ In the cloud
○ We outsource development and hosting
○ We don't have servers, or I don't know \* How do you apply patches (fixes) to your systems?
☐ We have a centralized patch management System
☐ Patches are applied manually
☐ We have a patch management schedule
☐ We utilize a mixture of automated patch management and manual patches, our cloud systems are ephemeral (short-lived) and updated with the latest image from a trusted source
☐ We don't do this, or I don't know \* What protection (anti-virus and advanced defenses for servers) do you use?
☐ Anti-virus for windows Servers and Linux Servers
☐ Intrusion Protection System (IPS)
☐ Intrusion Detection System (IDS)
☐ Anti-virus on Desktops/Laptops
☐ We don't do this, or I don't know \* How do you manage machine images (the software that goes on a server)?
☐ We have a standard (same way every time) image (or procedure for configuring) our servers
☐ Server are hardened to CIS benchmark standards
☐ Updates are applied regularly
☐ We don't do this , or I don,t know \* How is acess to various computer software systems managed in your organization?
○ LDAP Systems Fully Integrated
○ LDAP (Define) Systems Mainly
○ Each System is updated as users need it
○ We have limited or no centralized user management, or I don't know Previous [ Next ]

FIG. 5E

IRONBENCH

IronBench Compliance Navigator™ Maturity Assessment

Systems

* How do you use a Cloud Access Security Broker (CASB)?

○ We have a fully implemented CASB solution that covers enterprise tools as well as "shadow IT" or unsanctioned tools
○ We have a CASB implemented to cover enterprise tools only
○ We have a CASB implemented to cover unsanctionad tools only
○ We have a plan to adopt a CASB within the next year
○ We don't have one, or I don't know

* How would you describe your Data Loss Prevention Strategy (DLP)?

○ We have a DLP solution in place for all forms of data egress in the company
○ We have a DLP solution in place for email only
○ We block certain sites which could be used to store sensitive data
○ We don't have one, or I don't know

* Do you have a business continuity and disaster recovery plan?

○ We have an annually-tested, documented plan, which includes third-party outages
○ We have a documented plan
○ We don't have one, or I don't know

* What cyber security practices does your Human Resources department follow?

☐ We perform background checks on all prospective employees and contingent workers (those with access to systems with company information)
☐ We require all employees to attend formal training prior to accessing our network
☐ We decline all prospects with a history of dishonest behavior indicated by a criminal record of fraud, extortion, embezzlement, or similar convictions
☐ We perform credit checks on prospects with access to our accounting/financial systems and decline prospects with excessive obligations relatives to income
☐ We don't have one, or I don't know Previous | Next

FIG. 5F

IR⊚NBENCH

IronBench Compliance Navigator™ Maturity Assessment
Company

\* What security controls apply to your business or will in the future ?
- ○ We take credit cards, and use a vendor (like stripe) to manage card data (PCI)
- ○ We take credit cards, and implemented our own solution for card data storage (PCI)
- ○ We have protected health information in our systems (HIPAA)
- ○ We are a healthcare company or serve healthcare companies (HITRUST)
- ○ We are publicly traded (sox)
- ○ We do business with the united states government (NIST)
- ○ We do business with standards-based international entities (ISO)
- ○ We hold european cosumer data in our systems (GDPR)
- ○ We are a corporation that is/was run by auditors (COBIT)
- ○ We have to comply with other standards
- ○ No security controls apply to our business, or I dont know \* Do you have an information security or regulatory/compliance department in your company?
- ○ Yes, This function exists in our company
- ○ We have a single person in the organization that deals with this sort of thing (such as a virtual CISO or Attorney)
- ○ No, or I don't know \*What elements of an information security program do you have?
- ☐ Annual external audit
- ☐ Full-time staff dedicated to security
- ☐ Annual risk assessments for IT processes, programs, and people
- ☐ Written policies, procedures, and standards for use of all IT systems
- ☐ We don't do this, or I don't know \*What audit elements do you have in place?
- ■ A regular audit program
- ■ Automated, auditable events with notifications in our systems
- ■ A searchable system (ELK, Kibana, splunk)
- ■ We have lots of log files when we need them
- ■ We dont do this, or I don't know \* How do you manage third party/ vendor risk?
- ☐ We perform an impact analysis on every third party vendor
- ☐ On-site visits
- ☐ Annual SOC2 Reviews
- ☐ Performance evaluations
- ☐ We only work with companies and people we know well
- ☐ None of the above, or I don't know Previous [ Next ]

FIG. 5G

IRONBENCH
IronBench Compliance Navigator Maturity Assessment

Contact

*Contact Name

*Company

*Phone Number

*Email Address

*Confirm Email Address

Previous  [Next]

FIG. 6

IRONBENCH

IronBench Information Security Assessment Results

Areas for Improvement — 318

◉ DETECT
Develop and implement appropriate activities to identify the occurrence of a cybersecurity event. — 48/100

⊕ PROTECT ← 316
Develop and implement appropriate safeguards to ensure delivery of critical services.     <u>700</u> — 50/100

🔍 IDENTIFY ← 314
Develop an organizational understanding to manage cybersecurity risk to systems, people, assets, data, and capabilities. — 51/100

↯ RESPOND ← 320
Develop and implement appropriate activities to take action regarding a detected cybersecurity incident. — 67/100

Your assessment revealed the following areas of strength.

RECOVER — 322
100/100

IronBench specializes in Information Security and can help in every phase of your InfoSec Program. We'd love to work with you if there any areas for improvement identified in your assessment.

Get in Touch
1-800-901-3952

FIG. 7

PROTECT
How do you deliver software?
Updates to software are done manually on an as-needed basis
DETECT
How do you approach penetration testing?
We use automated software to perform penetration testing
PROTECT
How do you prevent new vulnerabilities from being introduced?
We do periodic vulnerability scanning
DETECT
How do you detect vulnerabilities in your existing systems?
We scan the environments for vulnerabilities daily
PROTECT
How do you test your software?
We practice test-driven development when we build software
RESPOND
How do you apply network security in the cloud?
We utilize VPNs to get to the cloud and VPCs to work within the cloud with a "deny by default" system configuration
PROTECT
How do you segment your data and network?
We logically separate our environments including, but not limited to: development, test, and production
PROTECT
Is your data encrypted at rest (when sitting on a server)?
All data is encrypted at rest
PROTECT
Is your data encrypted in transit (when moving around within servers and on the network)?
All data is encrypted in transit
PROTECT
How do you implement segregation of duties and least privilege?
We use separate accounts for administrative privileges on local machines (laptops/desktops)
DEETECT
How do you deal with malicious code and/or insider threats?
We scan our software for malicious code.
RECOVER
How would you describe your response plan?
We have a disaster recover plan (DRP), with a recovery point objective (RPO) and recovery time objective (RTO), and have tested this plan to meet expectations
PROTECT
How do you manage keys and/or secrets?
We use a third party secrets management tool like HashiCorp Vault, Amazon KMS, or Azure Secrets Vault
IDENTIFY
Choose the statement that best describes your privacy program.
We have a privacy policy published on our website
IDENTIFY
Tell us about your Software Development Lifecycle (SDLC).
We have a written SDLC that all development, feeder, and receiving organizations conform to

FIG. 8A

PROTECT
Web Application Firewall
We utilize a web application firewall that protects us from things like XSS (cross-site scripting), SQL injection, and web session hijacking
PROTECT
Application Programming Interface (API) Protection
We follow a "deny by default" system with everything we do
DETECT
Distributed Denial Of Service (DDOS) Protection
We use CDN, CloudFront, Cloudflare, AWS Shield or similar technologies to mitigate our DDOS exposure
PROTECT
How do you use tokenization?
We utilize tokenization for session management and/or other critical architectural and functional needs
IDENTIFY
How do you review entitlements?
We review all entitlements annually
PROTECT
Tell us a bit about how you manage cross-cloud communications.
We have a plan to manage cross-cloud communications (e.g. Azure to AWS or On-Prem to GCP) and have implemented that plan based on least privilege
DETECT
What do you use for security monitoring and auditing?
We have a robust auditing and monitoring program. All of our events go into a Security Information and Event Management (SEIM) tool (e.g. Splunk) and are analyzed automatically and manually for malicious activity inside and outside our organization.
IDENTIFY
How do you handle Security Exceptions and/or Variances?
We have a process for when we don't use best practices. For example, we record the variation from standard and put a time to remediation in place that is approved by a senior leader
IDENTIFY
Where are your servers?
Data Center
PROTECT
How do you apply patches (fixes) to your systems?
We have a centralized patch management system
PROTECT
What protection (anti-virus and advanced defenses for servers) do you use?
Anti-virus for Windows Servers and Linux Servers
PROTECT
How do you manage machine images (the software that goes on a server)?
We have a standard (same way every time) image (or procedure for configuring) our servers
PROTECT
How is access to various computer software systems managed in your organization?
LDAP Systems Fully Integrated
PROTECT
How do you use a Cloud Access Security Broker (CASB)?
We have a fully implemented CASB solution that covers enterprise tools as well as "shadow IT" or unsanctioned tools
DETECT
How would you describe your Data Loss Prevention Strategy (DLP)?
We have a DLP solution in place for all forms of data egress in the company

FIG. 8B

RESPOND
Do you have a business continuity and disaster recovery plan?
We have an annually-tested, documented plan, which includes third-party outages

IDENTIFY
What cyber security practices does you Human Resources department follow?
We perform background checks on all prospective employees and contingent workers (those with access to systems with company information)

IDENTIFY
Do you have an information security or regulatory/compliance department in your company?
Yes. This function exists in our company

DETECT
What elements of an information security program do you have?
Annual external audit

DETECT
What audit elements do you have in place?
A regular audit program

IDENTIFY
How do you manage third party/vendor risk?
We perform an impact analysis on every third party vendor

Brenton Rothchild
My Account

← Back to standard

PCI DSS 3.2.1 / PCI 3.2.1 V0.1     🔒 Published

Install and Maintain a Firewall Configuration to Protect cardholder Data

PCI Requirement 1
Questions

| Question | Answers |
|---|---|
| Do you establish and implement firewall and router configuration standard? | 2 |
| Do you have a formal process for approving and testing all network connections and changes to the firewall and router configurations? | 2 |
| Do you have a documented procedures to verify there is; a formal process for testing and approval all network connections and changes to firewall and router configurations? | 2 |
| Do you have a current network diagram that identifies; all connections between the cardholder data environment (CDE) and other networks, including any wireless networks? | 2 |
| Do you have a current diagram that shows all cardholder data flows across systems and networks? | 2 |
| Do you have a established requirements for a firewall at each Internet connection and between any demilitarized zone (DMZ) and the internal network zone? | 2 |
| Do you have a description of groups, roles, and responsibilities for management of network components? | 2 |
| Can you have provide documentation of business justification and approval for use of all services, protocols, and ports allowed, including documentation of security features implemented for those protocols considered to insecure? | 2 |
| Do you maintain a log of firewall and router rule sets that are reviewed at least every six months | 2 |
| Have you built firewall and router configurations that restrict connections between untrusted networks and any system components in the cardholder data environment (CDE)? | 2 |
| Do you restrict inbound and outbound traffic to only what is necessary for the cardholder data environment (CDE) while explicitly all other traffic? | 2 |
| Do you secure and synchronize router configuration files? | 2 |
| Have you installed perimeter firewalls between all wireless networks and the cardholder data environment (CDE)? | 2 |
| Do you prohibit direct public access between the Internet and any system component in the cardholder data environment (CDE)? | 2 |
| Do you implement a demilitarized zone (DMZ) to limit inbound traffic to only system componenets that provide authorized publicly accessible services, protocols, and ports? | 2 |
| Do you limit inbound internet traffic to IP address within the demilitarized zone (DMZ)? | 2 |
| Do you implement anti-spoofing measures to detect and block forged source IP addresses from entering the network? | 2 |
| Do you prohibit unauthorized outbound traffic from the cardholder data environment (CDE) to the Internet? | 2 |
| Do you permit only "established" connections into the network? | 2 |
| Do you place system components that store cardholder data (such as a database) in an internal network zone? if so, is it segregated from demilitarized zone (DMZ) and other unstrusted networks? | 2 |
| Do you disclose private IP addresses and routing information to unauthorized parties? | 2 |
| Do you install personal firewall software or equivalent functionality on portable computing devices that connect to the internet to the when outside the network, including those which are also used to access the cardholder data environment (CDE)? | 2 |
| Can you provide documented security policies and operational procedures for managing firewalls are a) documented, b) in use, and c) known to all affected parties? | 2 |

← 1700

|  | Brenton Rothchild ▼ |
|---|---|
|  | My Account |

← Back to reports
PCI DSS 3.2.1 / PCI 3.2.1 V0.1                      🔒 Published

Category Summary Report

| Category | Questions Scored |
|---|---|
| ☐ Install and Maintain a Firewall Configuration to Protect Cardholder Data | 23/23 |
| ☐ Do Not Use Defaults for System Passwords | 13/13 |
| ☐ Protect Stored Cardholder Data | 24/24 |
| ☐ Encrypt Transmission of Cardholder Data Across Open, Public Networks | 4/4 |
| ☐ Protect All systems Against Malware and Regularly Update the Anti-Virus Software or programs | 6/6 |
| ☐ Develop and maintain Secure Systems and Applications | 16/16 |
| ☐ Restrict Access to Cardholder Data by Business Need to Know | 7/7 |
| ☐ Identify and Authenticate Access to System Components | 16/16 |
| ☐ Restrict Physical Access to Cardholder Data | 16/16 |
| ☐ Track and Monitor All Access to Network Resources and cardholder Data | 11/11 |
| ☐ Regularly Test Security System and Processes | 10/10 |
| ☐ Maintain a Policy That Addresses Information Security for All Personnel | 14/14 |

Brenton Rothchid
My Account

← Back to reports
PCIDSS 3.2.1 / PCI 3.2.1 V0.1    🔒 Published

Category Summary Report

| Question | Answers Scored |
|---|---|
| Do you establish and implement firewall and router configuration standards? | 2/2 |
| Do you have a formal process for approving and testing all network connections and changes to the firewall and router configuration? | 2/2 |
| Do you have documented procedures to verify there is a formal process for testing and approval of all network connections and changes to the firewall and router configuration? | 2/2 |
| Do you have a current network diagram that identifies all connections between the cardholder data environment (CDE) and other networks, including any wireless networks? | 2/2 |
| Do you have a current diagram that shows all cardholder data flows across systems and networks? | 2/2 |
| Do you have established requirements for a firewall at each internet connection and between any demilitarized zone (DMZ) and the internal network zone? | 2/2 |
| Do you have a description of groups, roles, and responsibilities for management of network components? | 2/2 |
| Can you provide documentation of business justification and approval for use of all services, protocols, and ports allowed, including documentation of security features implemented for those protocols considered to be insecure? | 2/2 |
| Do you maintain a log of firewall and router rule sets that are reviewed at least every six months? | 2/2 |
| Have you built firewall and router configurations that restrict connections between untrusted networks and any system components in the cardholder data environment(CDE)? | 2/2 |
| Do you restrict inbound and outbound traffic to only what is necessary for the cardholder data environment (CDE) while explicitly denying all other traffic? | 2/2 |
| Do you secure and synchronize router configuration files? | 2/2 |
| Have you installed perimeter firewalls between all wireless networks and the cardholder data environment (CDE) | 2/2 |
| Do you prohibit direct public access between the Internet any system component in the cardholder data environment (CDE) | 2/2 |
| Do you implement a demilitarized zone (DMZ) to limit inbound traffic to only system components that provide authorized publicly accessible services, protocols, and ports? | 2/2 |
| Do you limit inbound internet traffic to IP addresses within the demilitarized zone (DMZ)? | 2/2 |
| Do you implement anti-spoofing measures to detect and block forged source IP addresses from entering the network? | 2/2 |
| Do you prohibit unauthorized outbound traffic from the cardholder data environment (CDE) to the Internet? | 2/2 |
| Do you permit only "established" connections into the network? | 2/2 |
| Do you place system components that store cardholder data (such as a database) in an internal network zone? if so, is it segregated from the demilitarized zone (DMZ) and other untrusted networks? | 2/2 |
| Do you disclose private IP addresses and routing information to unauthorized parties? | 2/2 |
| Do you install personal firewall software or equivalent functionality on any portable computing devices that connect to the internet when outside the network, including those which are also used to access the cardholder data environment (CDE) ? | 2/2 |
| Can you provide documented security policies and operational procedures for managing firewalls are a) documented, b) in use, and c) known to all affected parties? | 2/2 |

Report Scoring

QUESTION
Do you establish and implement firewall and router configuration standards?

| Scorable | Answer | Score |
|---|---|---|
| ✓ | Yes | 5 |
| ✓ | No | 0 |

CANCEL

1902

| | |
|---|---|
| and networks? | |
| Do you have established requirements for a firewall at each internet connection and between any demilitarized zone (DMZ) and the internal network zone? | 2/2 |
| Do you have a description of groups, roles, and responsibilities for management of network components? | 2/2 |
| Can you provide documentation of business justification and approval for use of all services, protocols, and ports allowed, including documentation of security features implemented for those protocols considered to be insecure? | 2/2 |
| Do you maintain a log of firewall and router rule sets that are reviewed at least every six months? | 2/2 |
| Have you built firewall and router configurations that restrict connections between untrusted networks and any system components in the cardholder data environment(CDE)? | 2/2 |
| Do you restrict inbound and outbound traffic to only what is necessary for the cardholder data environment (CDE) while explicitly denying all other traffic? | 2/2 |
| Do you secure and synchronize router configuration files? | 2/2 |
| Have you installed perimeter firewalls between all wireless networks and the cardholder data environment (CDE) | 2/2 |
| Do you prohibit direct public access between the Internet any system component in the cardholder data environment (CDE) | 2/2 |
| Do you implement a demilitarized zone (DMZ) to limit inbound traffic to only system components that provide authorized publicly accessible services, protocols, and ports? | 2/2 |
| Do you limit inbound internet traffic to IP addresses within the demilitarized zone (DMZ)? | 2/2 |
| Do you implement anti-spoofing measures to detect and block forged source IP addresses from entering the network? | 2/2 |
| Do you prohibit unauthorized outbound traffic from the cardholder data environment (CDE) to the Internet? | 2/2 |
| Do you permit only " established" connections into the network? | 2/2 |
| Do you place system components that store cardholder data (such as a database) in an internal network zone? if so, is it segregated from the demilitarized zone (DMZ) and other untrusted networks? | 2/2 |
| Do you disclose private IP addresses and routing information to unauthorized parties? | 2/2 |
| Do you install personal firewall software or equivalent functionality on any portable computing devices that connect to the internet when outside the network, including those which are also used to access the cardholder data environment (CDE) ? | 2/2 |
| Can you provide documented security policies and operational procedures for managing firewalls are a) documented, b) in use, and c) known to all affected parties? | 2/2 |

FIG. 19

000
METHODS, SYSTEMS AND COMPUTING PLATFORMS FOR EVALUATING AND IMPLEMENTING REGULATORY AND COMPLIANCE STANDARDS

RELATED APPLICATIONS

This application claims priority to U.S. Provisional Patent Application No. 62/786,742, entitled "Methods, Systems and Computing Platforms for Evaluating and Implementing Regulatory and Compliance Standards", filed Dec. 31, 2018, hereby incorporated by reference in its entirety.

FIELD OF THE INVENTION

The present invention relates to assessing and understanding implementation of regulatory and compliance standards associated with use of technology. Particularly, the present invention relates to assisting an organization, which is subject to regulatory and compliance standards, identify and implement those regulatory and compliance standards associated with their use of technology. More particularly, but not exclusively, the present invention relates to evaluating processes, policies and procedures in determining whether an organization is properly implementing such regulatory and compliance standards.

BACKGROUND

Businesses want, need and often are required to manage their risk through government mandate, especially in cybersecurity and information security areas. Examples of current regulatory and compliance standards include NIST (provides a policy framework of computer security guidance for how private sector organizations in the United States can assess and improve their ability to prevent, detect, and respond to cyber-attacks), PCI (the Payment Card Industry Data Security Standard (PCI DSS) is an information security standard for organizations that handle branded credit cards from the major card schemes), HiTRUST (the Health Information Trust Alliance), is a privately held company located in the United States, which in collaboration with healthcare, technology and information security leaders, has established a Common Security Framework (CSF) used by all organizations creating, accessing, storing or exchanging sensitive and/or regulated data), HIPAA (the Health Insurance Portability and Accountability Act of 1996) was created primarily to modernize the flow of healthcare information, stipulate how Personally identifiable Information maintained by the healthcare and healthcare insurance industries should be protected from fraud and theft, and address limitations on healthcare insurance coverage), GDPR (the General Data Protection Regulation) is a regulation in EU law on data protection and privacy for all individuals within the European Union (EU) and the European Economic Area (EEA) addressing the export of personal data outside the EU and EEA areas, COBIT (Control Objectives for Information and Related Technologies) is a good-practice framework created by international professional association ISACA for information technology (IT) management and IT governance and provides an implementable set of controls over information technology and organizes them around a logical framework of IT-related processes and enablers), ITIL (formerly an acronym for Information Technology Infrastructure Library is a set of detailed practices for IT service management (ITSM) focusing on aligning IT services with the needs of business and underpins ISO/IEC 20000 (previously BS 15000), the International Service Management Standard for IT service management), SOX (the Sarbanes-Oxley Act) is a United States federal law setting new or expanded requirements for all U.S. public company boards, management and public accounting firms), CCPA (the California Consumer Privacy Act) focusing on data privacy.

However, many businesses do not know they are subject to regulatory and compliance standards. Further, even when these businesses are aware, they may not understand how mature their processes, policies, and procedures are when it comes to meeting these standards.

Therefore, what is needed is a tool which can determine a business' maturity with regulatory and compliance standards.

What is also needed is a tool where a business can answer questions in a guided self-paced environment to determine maturity with regulatory and compliance standards.

What is also needed is a tool where a business can receive maturity assessments and recommendations for actions in applicable areas of various regulatory and compliance standards.

What is also needed is a tool where a business can receive a template to guide them in creating, maintaining or updating documentation for processes, policies and procedures relative to their applicable standards.

What is further needed is a tool which understands relationships between different regulatory and compliance standards in order to simply the process of performing an assessment of compliance with one or more regulatory or compliance standards when assessment of another regulatory or compliance standard has been performed.

SUMMARY

Therefore, it is a primary object, feature, or advantage of the present invention to improve over the state of the art.

It is another object, feature or advantage of the present invention to provide for managing risk, especially cybersecurity risks and information security risks associated with the use of technology.

It is a further object, feature, or advantage of the present invention to provide organizations whom are subject to regulatory and compliance standards associated with the use of technology an understanding of how mature their processes, policies and procedures are in meeting those standards, especially those associated with the use of technology.

It is a still further object, feature, or advantage of the present invention to provide an online tool which can provide answers to questions in a guided self-paced environment.

Another object, feature, or advantage is to provide, through these answers, an analysis which provides a maturity assessment and recommendation for action in applicable areas of various regulatory and compliance standards.

Yet another object, feature, or advantage is providing a business with a tool for creating, maintaining or updating documentation for processes, policies and procedures relative to their applicable standards.

One or more of these and/or other objects, features, or advantages of the present invention will become apparent from the specification and claims that follow. No single embodiment need provide every object, feature, or advantage. Different embodiments may have different objects, features, or advantages. Therefore, the present invention is not to be limited to or by any objects, features, or advantages stated herein.

According to one aspect, a compliance navigator may include: (a) a processor capable of processing a compliance navigator software; (b) a network operably coupled to the processor capable of connecting to a computing device of a user also on the network, (c) a memory operably coupled to the processor for storing the compliance navigator software wherein the processor provides a webpage allowing the user to interact with the compliance navigator software, wherein the user is asked a series of questions by the compliance navigator software, wherein the answers to the questions presented are analyzed by the compliance navigator software to determine if the user is in compliance with a selected governmental or industrial standard.

According to another aspect, a method of compliance navigation in embodiments of the present invention may include: (a) presenting an online information security questionnaire to a user, (b) assessing answers to the online information security questionnaire, (c) displaying results of the assessment to the user, (d) purchasing an information security assessment module, (e) asking the user if they wish to purchase additional information security assessments, (f) updating the questionnaire provide to the user whenever information security standards change, (g) cross mapping answers directed to a first information security assessment module to a second information security module, and (h) notifying the user when information security standards change.

According to another aspect, a system for information security compliance may include: (a) a user computing system containing information which is subject to an information security standard, (b) a cloud network operably coupled to the third-party computing system, (c) at least one client device operably coupled to the user computing system and the cloud network, (d) a website in communication with the at least one client device, wherein the website allows the user to interact with a compliance navigator software, wherein the user is asked a series of questions by the compliance navigator software, wherein the answers to the questions presented are analyzed by the compliance navigator software to determine if the user is in compliance with a selected governmental or industrial standard.

According to another aspect, a method of compliance navigation includes steps of providing access to a user to a compliance navigator software tool, the compliance navigator software tool comprising a content management system an assessment module, an access control module, an audit module, and an automated testing module. The method further includes presenting a plurality of assessment questions to the user by executing the assessment module, assessing answers to the plurality of assessment questions using the assessment module, the assessment module comprising machine-readable instructions stored on the non-transitory machine-readable storage medium, and displaying results of the assessment to the user.

According to another aspect, a system includes a processor capable of processing a compliance navigator software, a network operably coupled to the processor capable of connecting to a computing device of a user also on the network, and a memory operably coupled to the processor for storing the compliance navigator software, the compliance navigator software comprising a content management system, at least one assessment module, an access control module, an audit module, and an automated testing module.

According to another aspect, a method for performing an online assessment of compliance with a first standard selected from a set of standards, each of the standards associated with cyber-security risk and information security risk is provided. The method includes cross-mapping answers from the first standard selected from the set of standards with answers from one or more other standards within the set of standards. The method further includes determining using a processor executing software instructions a plurality of assessment questions to ask the user, each of the plurality of assessment questions associated with the first standard and by reducing the plurality of assessment questions associated with the first standard based on the cross-mapping of the answers from the first standard selected from the set of standards with one or more of the other standards within the set of standards wherein answers have already been provided for assessment questions associated with the one or more of the other standards. The method further includes presenting the plurality of assessment questions to the user through a user interface by executing the assessment module on the processor, each of the plurality of assessment questions associated with the first standard. The method further includes assessing answers to the plurality of assessment questions using the assessment module executing on the processor to generate results of the online assessment and displaying the results of the assessment to the user using a display associated with the user interface.

The method may further include the step of accessing over a network results of an external testing tool and storing the results from the external testing tool in association with one or more of the answers to the plurality of assessment questions. The accessing may be performed using an application program interface (API). The accessing may be performed using a webhook.

The method may further include receiving over a network data points from a software application associated with the assessment, wherein the software application incorporates software code from an automated build pipeline harness which provides the data points and wherein the data points are associated with one or more of the answers to the plurality of assessment questions. The assessment module may be further configured to assess the data points along with the answers to generate the results of the online assessment.

According to another aspect, a system may include a processor executing software instructions defining a compliance navigator for determining compliance with one or more standards associated with cyber-security risk or information security risk, a network operably coupled to the processor capable of connecting to a computing device of a user also on the network, and a memory operably coupled to the processor for storing the compliance navigator software, the compliance navigator software comprising a content management system, at least one assessment module, an access control module, an audit module, and an automated testing module. The processor generates a web-based interface allowing the user to interact with the compliance navigator software. The user may be asked a series of questions by the compliance navigator software. The answers to the questions presented may then be analyzed by the compliance navigator software to determine if the user is following a first compliance standard. The compliance navigator software may be adapted to cross map answers given for the first compliance standard to a second compliance standard. The automated testing module may provide for interfacing with an external computing system performing testing and updating one or more answers of an assessment with results obtained from the external computing system.

According to another aspect, a method of performing an online assessment of compliance with cyber-security risk and information security risk standards includes steps of providing access to a user to a compliance navigator software tool, the compliance navigator software tool comprising a content management system an assessment module, an access control module, an audit module, and an automated testing module, presenting a plurality of assessment questions to the user by executing the assessment module, assessing answers to the plurality of assessment questions using the assessment module, the assessment module comprising machine-readable instructions stored on the non-transitory machine-readable storage medium, and displaying results of the assessment to the user. The method may further include cross mapping answers directed to a first information security assessment module to a second information security module. The automated testing module may be configured for accessing results from at least one external computing system and updating one or more answers associated with the questions of the assessment module with the results. The at least one external computing system may be accessed via at least one of an application program interface and a webhook.

BRIEF DESCRIPTION OF THE DRAWINGS

The above-recited and other advantages and features of the disclosure will become apparent by reference to specific embodiments thereof which are illustrated in the drawings. These drawings depict only exemplary embodiments of the disclosure and are not therefore to be limiting of its scope.

Figure 5A:
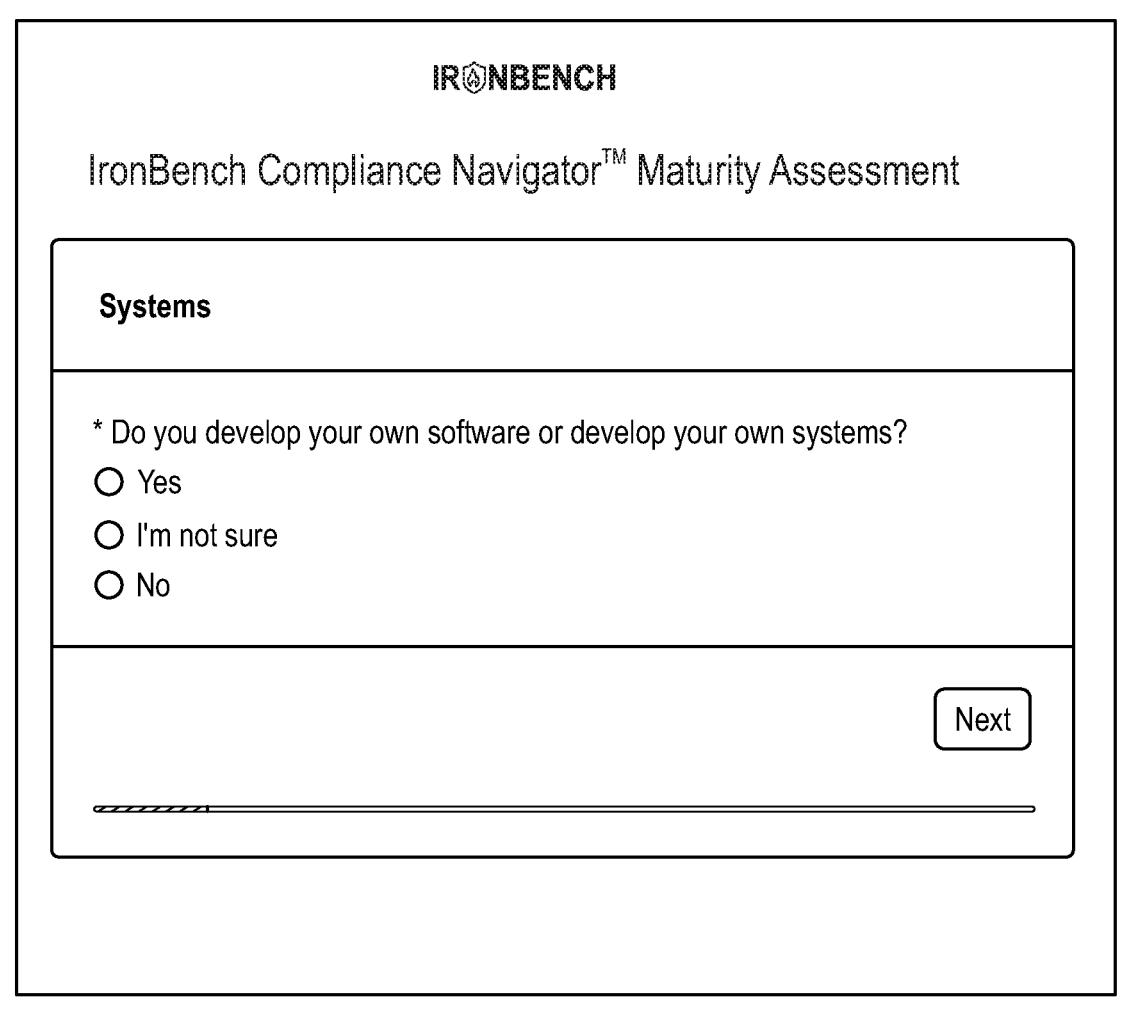

FIG. 5A to FIG. 5G are an exemplary embodiment for a systems development pages in an embodiment of the present invention;

FIG. 6 is an exemplary embodiment of for a contact development page in an embodiment of the present invention;

FIG. 7 is an exemplary embodiment of an Information Security Assessment Results page in an embodiment of the present invention;

FIG. 8A to FIG. 8C are exemplary embodiments of Assessment Questions Results pages in an embodiment of the present invention.

FIG. 13 is a screen display for an administrator illustrating selection of a category.

FIG. 17 is a screen display for an administer in which the administer may be shown the list of categories for the report.

FIG. 18 is a screen display for an administrator illustrating that after selecting a category, the administrator is able to see a list of questions in that category.

FIG. 19 is a screen display for an administrator illustrating that after choosing a question, the administrator is able to review and edit scoring.

DETAILED DESCRIPTION

Figure 1:
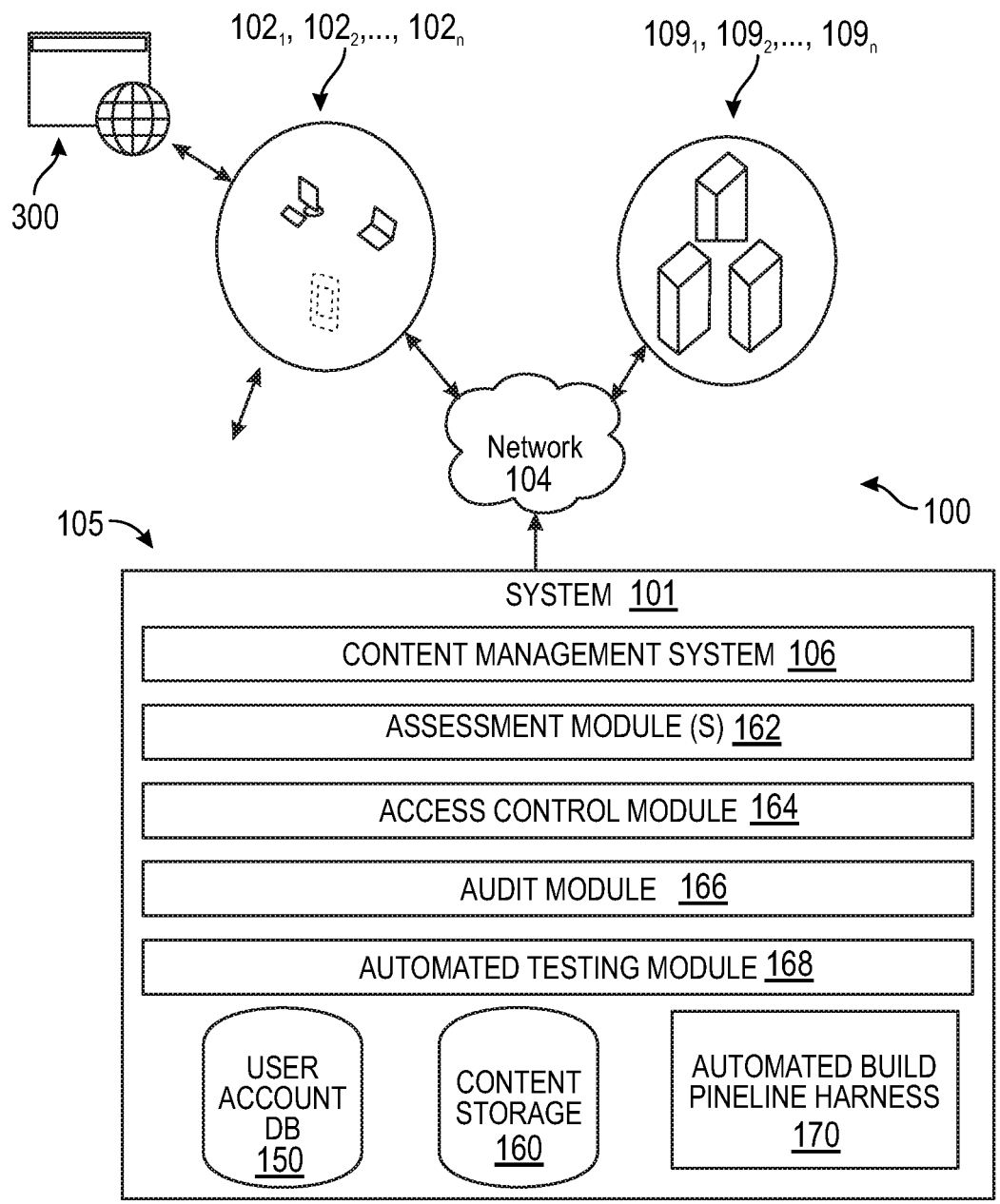
FIG. 1 is an exemplary configuration of devices and a cloud network in accordance with an embodiment of the present invention.

The following discussion is presented to enable a person skilled in the art to make and use the present teachings. Various modifications to the illustrated embodiments will be clear to those skilled in the art, and the generic principles herein may be applied to other embodiments and applications without departing from the present teachings. Thus, the present teachings are not intended to be limited to embodiments shown but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of the present teachings. Skilled artisans will recognize the examples provided herein have many useful alternatives and fall within the scope of the present teachings. While embodiments of the present invention are discussed in terms of compliance management, it is fully contemplated embodiments of the present invention could be used in most any regulatory and compliance system without departing from the spirit of the invention.

As stated before, businesses and organizations (both public and private) want to manage their risk, especially in cyber-security and information security areas. Many businesses, especially startups and medium sized businesses, do not know they are subject to regulatory and compliance standards. Further, even when they are aware, they may not understand how mature their processes, policies, and procedures are when it comes to meeting these standards.

According to one aspect, a tool is provided which businesses can provide answers to questions in a guided, self-paced environment. Their answers, through a unique method of analysis within the tool, allow the business to receive maturity assessments and recommendations for action(s) in applicable areas of various regulatory and compliance standards. Additionally, the tool supplies the user with template content to guide them in creating, maintaining, or updating documentation for processes, policies, and procedures relative to their applicable standards.

The tool allows an organization, possibly a compliance officer, the ability to assess their need for an information security program in the event one does not exist in their current organization. For example, if a company is required to perform an audit of their information security protocol in order to obtain a contract with a larger company, then the compliance officer can utilize the present invention to provide an initial assessment. The end-user would understand whether their organization should have an information security program or not as compared to their current business, partners, clients, services, products and industry. The present invention could provide a summary page making recommendations on whether the end user company does or does not need additional programs and makes associative recommendations as to what steps the company should consider next for improvements.

To go through each one of the governmental and industry compliance and regulation standards could take an organization several months as each standard is quite lengthy and involved in its requirements. The present invention assists an end user to condense this assessment down to a matter of minutes with targeted and specific questions to decide as to whether a company is compliant or whether more work and even more security products may be needed.

Figure 2:
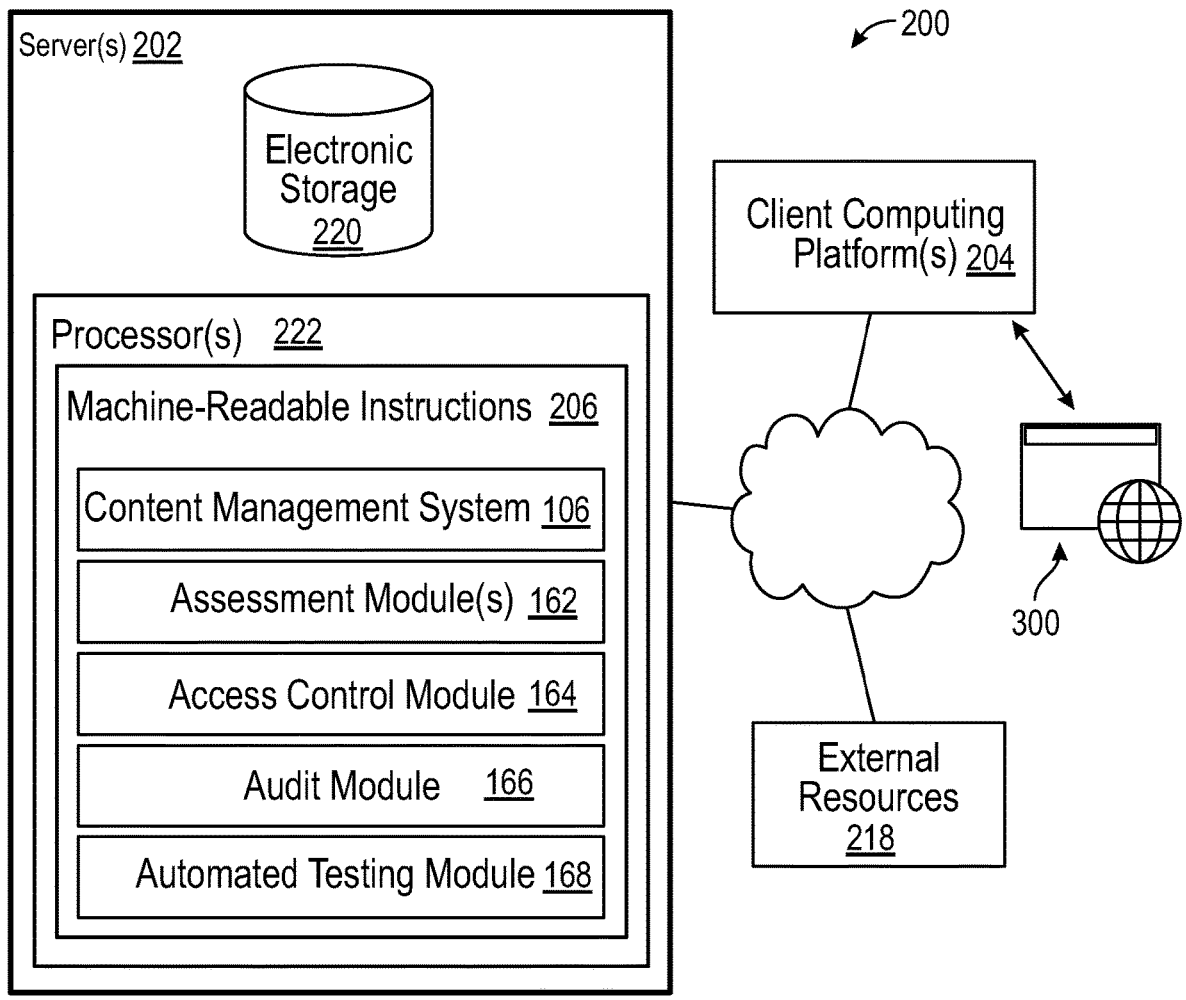
FIG. 2 is another exemplary system embodiment for a cloud network in an embodiment of the present invention.

An exemplary system configuration 100 is illustrated in FIG. 1, wherein electronic devices communicate via a cloud network. The system can be configured for use on a cloud network such as illustrated in FIG. 1 or FIG. 2. However, the present principles are applicable to a wide variety of network configurations facilitating the intercommunication of electronic devices. For example, each of the components of system 100 in FIG. 1 can be implemented in a localized or distributed fashion in a network.

The system 100 shown in FIG. 1 and system 200 of FIG. 2 represent a system of a user 105, which may represent a company engaging in a business which may be or needs to be following a governmental or industry standard.

In system 100, a user 105 can interact with a platform or system 101 through client devices $102_1, 102_2, \ldots, 102_n$ (collectively "102") connected to network 104 by direct and/or indirect communication. For the purposes of the current description, network 104 is a cloud network; however, most any network is contemplated for purposes of the present invention without deviating outside of the spirt of the invention. System 101 can support connections from a variety of different client devices, such as desktop computers, mobile computers, mobile communications devices, e.g. mobile phones, smart phones, tablets, smart televisions, set-top boxes, and/or any other network enabled computing devices. Client devices 102 can be of varying types, capabilities, operating systems, etc. Furthermore, the system 101 can concurrently accept connections from and interact with multiple client devices 102.

A user 105 can interact with system 101 via a client-side application installed on client device $102_i$. In some embodiments, the client-side application can include a content management system specific component. For example, the component can be a stand-alone application, one or more application plug-ins, and/or a browser extension. However, the user can also interact with system 101 via a third-party application, such as a web browser, residing on client device $102_i$ and is configured to communicate with system 101. In either case, the client-side application can present a user interface (UI) for the user to interact with system 101. For example, the user can interact with the system 101 via a client-side application integrated with the file system or via a webpage displayed using a web browser application.

The system 101 may include a content management system 106 which can be used to make it possible for a user to store content, as well as perform a variety of content management tasks, such as retrieve, modify, browse, and/or share the content. Furthermore, content management system 106 can make it possible for user 105 to access the content from multiple client devices 102. For example, in some embodiments, client device $102_i$ can upload content to content management system 106 via cloud network 104. The content can later be retrieved from content management system 106 using the same client device $102_i$ or some other client device $102_j$.

To facilitate the various services, a user 105 can create an account with system 101. The account information can be maintained in a user account database 150. The user account database 150 can store profile information for registered users. In some cases, the only personal information in the user profile can be a username and/or email address. However, system 101 can also be configured to accept additional user information. This may include answers to various assessment questions, results of assessments, meta-data tagging, user content, or other information.

User account database 150 can also include account management information, such as account type, e.g. free or paid; usage information, e.g. file edit history; maximum storage space authorized; storage space used; content storage locations; security settings; personal configuration settings; content sharing data; etc. Account management module 124 can be configured to update and/or obtain user account details in user account database 150. The account management module 124 can be configured to interact with any number of other modules in content management system 106.

An account can be used to store content, such as digital data, documents, text files, audio files, video files, etc., from one or more client devices 102 authorized on the account. The content can also include folders of various types with different behaviors, or other mechanisms of grouping content items together. For example, an account can include a public folder accessible to any user. The public folder can be assigned a web-accessible address. A link to the web-accessible address can be used to access the contents of the public folder. In another example, an account can include a photos folder intended for photos and providing specific attributes and actions tailored for photos; an audio folder providing the ability to play back audio files and perform other audio related actions; or other special purpose folders. An account can also include shared folders or group folders linked with and available to multiple user accounts. The permissions for multiple users may be different for a shared folder.

The content can be stored in content storage 160. Content storage 160 can be a storage device, multiple storage devices, or a server. Alternatively, content storage 160 can be a cloud storage provider or network storage accessible via one or more communications networks. System 101 can hide the complexity and details from client devices 102 so client devices 102 do not need to know exactly where the content items are being stored by system 101. System 101 can store the content items in a network accessible storage (SAN) device, in a redundant array of inexpensive disks (RAID), etc. Content storage 160 can store content items using one or more partition types, such as FAT, FAT32, NTFS, EXT2, EXT3, EXT4, ReiserFS, BTRFS, and so forth.

Content storage 160 can also store metadata describing content items, content item types, and the relationship of content items to various accounts, folders, or groups. The metadata for a content item can be stored as part of the content item or can be stored separately. In one variation, each content item stored in content storage 160 can be assigned a system-wide unique identifier.

Content storage 160 can decrease the amount of storage space required by identifying duplicate files or duplicate segments of files. Instead of storing multiple copies, content storage 160 can store a single copy and then use a pointer or other mechanism to link the duplicates to the single copy. Similarly, content storage 160 can store files more efficiently, as well as provide the ability to undo operations, by using a file version control tracking changes to files, different versions of files (including diverging version trees), and a change history. The change history can include a set of changes, when applied to the original file version, produce the changed file version.

The system 101 may include one or more assessment modules 162. The assessment module(s) may be used to assess the organization's needs for an information security program, the maturity of an existing information security program, to assess their organization and maturity measured against the most current version of one or more domestic or international standards. Where multiple assessment modules are present, each of the assessment modules 162 may be associated with a different standard or set of regulations. Cross-mapping may be performed within an assessment module or between assessment modules thereby reducing the effort required by the user. Cross-mapping allows for identifying questions and/or answers which are common to more than one standard or set of regulations. Where answers have already been provided as a part of an assessment for one standard or set of regulations, those answers may be used to populate cross-mapped portions of the assessments of other standards or sets of regulations. It is to also be understood that in some instances, an answer to one question in a first assessment associated with one standard or set of regulations may cross-map to more than one answer for more than one question in a second standard or set of regulations.

The system 101 may include an access control module 164. The access control module 164 may be used to control levels of access to data. This may include the ability to create and manage user accounts, assign controls which limit or restrict the ability of those user accounts to view, change, or remove data. For example, an administrator may be given greater access than a typical user.

The system 101 may include an audit module 166. The audit module 166 may be used to record any external audit events and their results against a given standard's individual tests or checks.

The system 101 may further include an automated testing module 168. The automated testing module 168 may be used to incorporate external testing results. Thus, the testing module 168 provides various mechanisms to recover, over time and with history, automated tests and their results against standards.

An automated build pipeline harness 170 is also provided. This software provides integration with external software build systems. It may include a library of software tests that can be easily incorporated into software build processes.

FIG. 2 illustrates a system 200 configured for a cloud network in accordance with one or more implementations. In some implementations, system 200 may include one or more servers 202. Server(s) 202 may be configured to communicate with one or more client computing platforms 204 according to a client/server architecture and/or other architectures. Client computing platform(s) 204 may be configured to communicate with other client computing platforms via server(s) 202 and/or according to a peer-to-peer architecture and/or other architectures. Users may access system 200 via client computing platform(s) 204.

Server(s) 202 may be configured by machine-readable instructions 206. Machine-readable instructions 206 may include one or more instruction modules. The instruction modules may include computer program modules. The instruction modules may include one or more of a content management system 106, assessment modules 162, access control module 164, audit module 166, and automated testing module 166, and/or other instruction modules.

In some implementations, server(s) 202, client computing platform(s) 204, and/or external resources 218 may be operatively linked via one or more electronic communication links. For example, such electronic communication links may be established, at least in part, via a network such as the Internet and/or other networks. It will be appreciated this is not intended to be limiting, and the scope of this disclosure includes implementations in which server(s) 202, client computing platform(s) 204, and/or external resources 218 may be operatively linked via some other communication media.

A given client computing platform 204 may include one or more processors configured to execute computer program modules. The computer program modules may be configured to enable an expert or user associated with the given client computing platform 204 to interface with system 200 and/or external resources 218, and/or provide other functionality attributed herein to client computing platform(s) 204. By way of non-limiting example, the given client computing platform 204 may include one or more of a desktop computer, a laptop computer, a handheld computer, a tablet computing platform, a phone or mobile device, a gaming console, an internet appliance, and/or other computing platforms.

External resources 218 may include sources of information outside of system 200, external entities participating with system 200, and/or other resources. In some implementations, some or all the functionality attributed herein to external resources 218 may be provided by resources included in system 200.

Server(s) 202 may include electronic storage 220, one or more processors 222, and/or other components. Server(s) 202 may include communication lines, or ports to enable the exchange of information with a network and/or other computing platforms. Illustration of server(s) 202 in FIG. 2 is not intended to be limiting. Server(s) 202 may include a plurality of hardware, software, and/or firmware components operating together to provide the functionality attributed herein to server(s) 202. For example, server(s) 202 may be implemented by a cloud of computing platforms operating together as server(s) 202.

Electronic storage 220 may comprise non-transitory storage media electronically storing information. The electronic storage media of electronic storage 220 may include one or both of system storage provided integrally (i.e., substantially non-removable) with server(s) 202 and/or removable storage removably connectable to server(s) 202 via, for example, a port (e.g., a USB port, a firewire port, etc.) or a drive (e.g., a disk drive, etc.). Electronic storage 220 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 220 may include one or more virtual storage resources (e.g., cloud storage, a virtual private network, and/or other virtual storage resources). Electronic storage 220 may store software algorithms, information determined by processor(s) 222, information received from server(s) 202, information received from client computing platform(s) 204, and/or other information that enables server(s) 202 to function as described herein.

Processor(s) 222 may be configured to provide information processing capabilities in server(s) 202. As such, processor(s) 222 may include one or more of a digital processor, an analog processor, a digital circuit designed to process information, an analog circuit designed to process information, a state machine, and/or other mechanisms for electronically processing information. Although processor(s) 222 is shown in FIG. 2 as a single entity, this is for illustrative purposes only. In some implementations, processor(s) 222 may include a plurality of processing units. These processing units may be physically located within the same device, or processor(s) 222 may represent processing functionality of a plurality of devices operating in coordination. Processor(s) 222 may be configured to execute modules 208, 210, 212, 214, and/or 216, and/or other modules. Processor(s) 222 may be configured to execute modules 106, 162, 164, 166, and/or 158, and/or other modules by software; hardware; firmware; some combination of software, hardware, and/or firmware; and/or other mechanisms for configuring processing capabilities on processor(s) 222. As used herein, the term "module" may refer to any component or set of components performing the functionality attributed to the module. This may include one or more physical processors during execution of processor readable instructions, the processor readable instructions, circuitry, hardware, storage media, or any other components.

It should be appreciated although modules 106, 162, 164, 166, and/or 158, are illustrated in FIG. 2 as being implemented within a single processing unit, in implementations in which processor(s) 222 includes multiple processing units, one or more of modules 106, 162, 164, 166, and/or 158, may be implemented remotely from the other modules. The description of the functionality provided by the different modules 106, 162, 164, 166, and/or 158 described below is for illustrative purposes, and is not intended to be limiting, as any of modules 106, 162, 164, 166, and/or 158 may provide more or less functionality than is described. For example, one or more of modules 106, 162, 164, 166, and/or 158, may be eliminated, and some or all its functionality may be provided by other ones of modules 106, 162, 164, 166, and/or 158 As another example, processor(s) 222 may be configured to execute one or more additional modules performing some or all the functionality attributed below to one of modules 106, 162, 164, 166, and/or 158.

With reference to FIG. 1 and FIG. 2, a client portal/webpage 300 can be accessed through system 100 or 200 through client machines 102 and/or client computing platforms 204. As discussed, the inventors have developed a tool which businesses can use to provide answers to questions regarding the need for additional processes for compliance with regulations in a guided, self-paced environment through client portal 300. These answers, allow the business to receive maturity assessments and recommendations for action(s) in applicable areas of various regulatory and compliance standards. Additionally, the tool will supply the user 105 with template content to guide them in creating, maintaining, or updating documentation for processes, policies, and procedures relative to their applicable standards.

Figure 3:
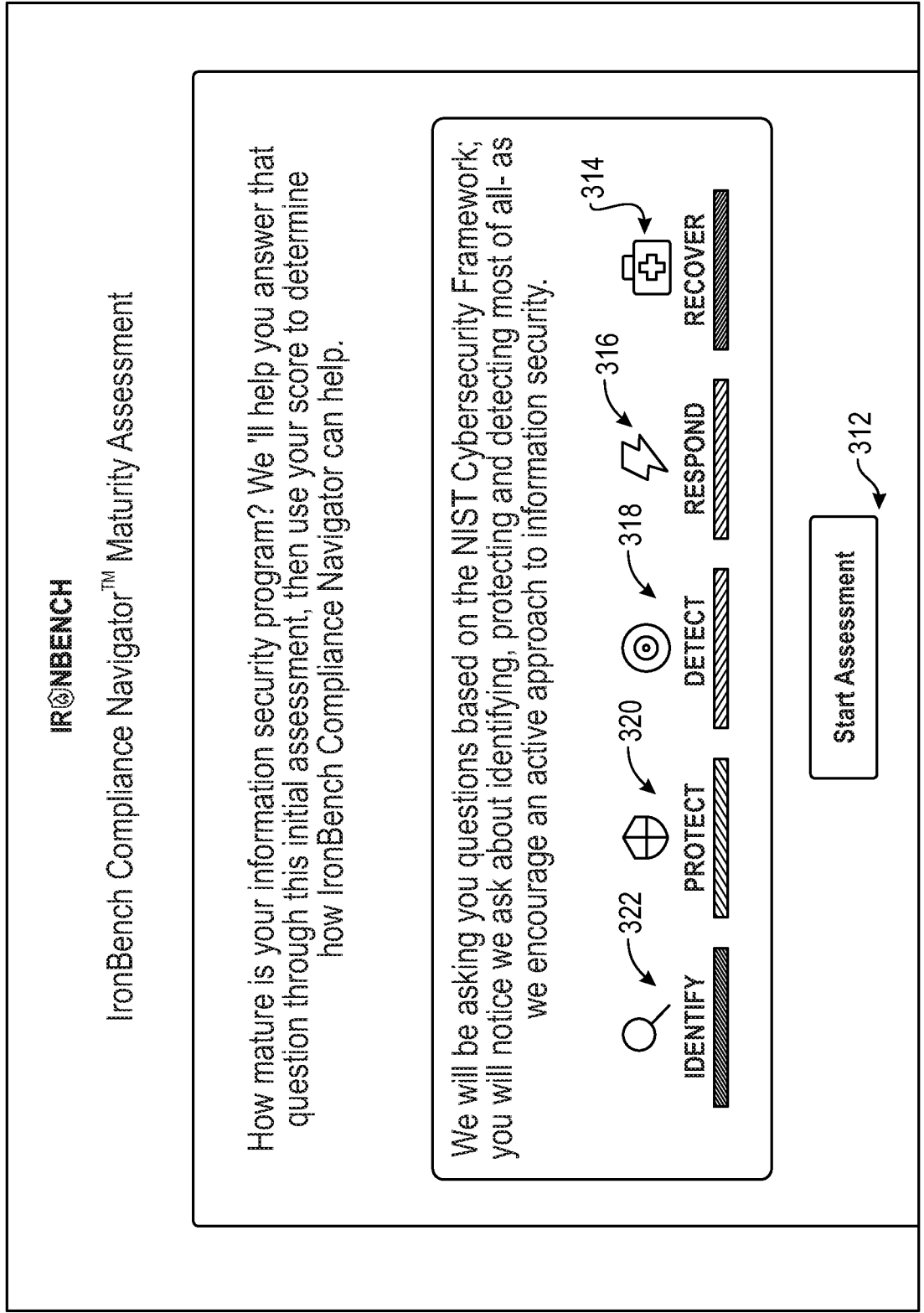
FIG. 3 is an exemplary system embodiment for an introductory page in an embodiment of the present invention.

With reference to FIG. 3 an exemplary system embodiment for an introductory page in an embodiment of the present invention is shown. Assessment introductory page 310 can be accessed by user 105 through client machines 102 and/or computing platforms 204. Assessment page 310 provides a user 105, perhaps a compliance officer for a company, the ability to assess a need for an information security program in the event one does not exist in their current organization or the existing information security program is not compliant with existing regulations.

If user 105 is asking themselves "Do, we need an information security program"? User 105 can navigate to assessment page 310 and take a survey and see if his company needs an information security program. At the end of the initial assessment, the end-user 105 would understand whether their organization should have an information security program or not as compared to their current business, partners, clients, services, products and industry. The resulting summary page would make recommendations on whether user 105 needs a program and makes associative recommendations as to what steps user 105 should consider next for improvements. User 105 could begin by clicking on the start assessment button 312.

Assessment program 400, discussed in more detail below, allows an organization the ability to assess the maturity of an existing information security program. The assessment program could be for all ranges of entities including those which believe they already have a really good information security program. They can take the assessment survey to not only provide proof their current information security is adequate, but they could also use the assessment to satisfy audit procedures.

At the end of the initial assessment, an end-user 105 would understand what is required for a typical enterprise class information security program and where their own implementation (or lack thereof) of these ideas measures accordingly. The assessment survey not only identifies what is required from a compliant information security system versus what the company may have, but the assessment program additionally identifies potential shortcomings and makes recommendations for improvement as is discussed in detail below.

The ability to assess organization and operational maturity measured against the most current version of one or more domestic and international standards, including, but not limited to: National Institute of Standards and Technology (NIST), Payment Card Industry (PCI), Health Information Trust Alliance (HiTRUST), Health Insurance Portability and Accountability Act (HIPAA), General Data Protection Regulation (GDPR), Control Objectives for Information and Related Technology (COBIT), IT Infrastructure Library (ITIL) and Sarbanes-Oxley Act (SOX). For example, if a company needs to be GDPR compliant and will soon be audited by a third-party organization, even if the company believes they are already well organized for the audit, they can perform a self-assessment to understand where they are currently at against the most up to date standards. Further, the assessment could be visualized as proof of vigilance and efforts to maintain standards. Further, based on the assessment, user 105 could determine what changes may need to be consider across the organization in order to ensure complete audit success. Further, the program provides recommendations according to the assessment results.

The ability to assess organizational and operational compliance against the most current version of one or more standards and then automatically cross-map those results to one or more additional standards at the same time. For example, if the user 105 has purchased the NIST assessment package and takes the assessment which results in a series of recommendations regarding what they should consider adding, removing and/or changing, the user 105 may be convinced to purchase an ISO/IEC 27001 (International Organization for Standardization/International Electrotechnical Commission) assessment package and perform another assessment based on a different standard. Assessment program 400 will automatically take all stored NIST answers the user 105 provided and automatically apply them to the ISO assessment in advance of the actual assessment activity. This allows the end-user 105 to progress through the ISO (or second assessment package) more quickly by minimizing the number of questions requiring same and similar answers as the previously taken NIST assessment.

Thus, if user 105 has already taken one assessment, all those answers will be available and potentially utilized when they purchase a second assessment as well. This feature can be referred to as proactive standards cross-mapping.

The ability for the user's organization to be (1) notified when changes to the regulations or standards have been published, (2) notified what portions of the previously purchased standards package these standards changes may apply, (3) notified of what implications these changes may have to existing operations accordingly are of great value to a company. For example, if user 105 has purchased the GDPR package and performed an assessment of their organization against the standard, and later in the year, whether planned or unplanned, the European Union publishes multiple revisions to the GDPR standard, the assessment program 400 will automatically update the client telling them changes have occurred to the GDPR standard, what the changes are, as well as, where the changes impact the original assessment. This notification and accompanying information enables the user 105 to determine if and to what extent the revisions affect them.

The assessment program 400 also provides the ability to purchase a documentation library for each standard purchased. The document library enables the user 105 to put in place a complete audit-enabling information security document library for their organization and provide the baseline policies, processes and procedures necessary against which they begin to train, measure and audit their organization against an operational standard. While the document enables the company to become auditable, the documents themselves do not guarantee passing an audit or complete compliance.

Another aspect of the assessment program 400 is a content management system, which provides the ability to purchase complete document libraries to fully implement a standard across an entire organization, pre-sized in recommended "Small, Medium and Large" organization document sets. Also, the ability to manage (add, remove, extend) the document library according to the client's explicitly unique attributes as it relates to their organization, industry, culture, products and services. Complete version traceability, metadata tagging for categorization and traceability, as well as, an ability to associate a bundled version of documents against a version of the standard in question, as well as, a version of the assessment results.

Another aspect of the assessment program 400 is access control, which is the ability to control levels of access to data in the tool. The tool provides the ability to create and manage user accounts and assign controls which limit or restrict the ability of those user accounts to view, change, or remove data. Data in the program is defined as program-provided content such as assessment questions, document library content, or results calculated and/or derived from user-provided content; or user-provided content, such as assessment answers and document library customization. For example, a given user account may be restricted to only viewing answers to a portion of a given standards-based assessment body of questions (i.e. read-only access). Another example, a given user account may only be able to access (view and change) all purchased document libraries across multiple standards and be prohibited from any access to the assessment questions, answers, or calculated assessment results.

Another aspect of the assessment program 400 is the ability to allow external parties to view data in the program. The program provides the ability to grant external parties, such as auditor or vendors, access to view data within the tool. Data in the tool is defined as tool-provided content such as assessment questions, document library content, or results calculated and/or derived from user-provided content; or user-provided content, such as assessment answers and document library customization. For example, a given user account may be restricted to only viewing answers to a portion of a given standards-based assessment body of questions (i.e. read-only access). For example, a company may grant their insurance agency who underwrites their cyber insurance policy access to view a current, up-to-date dashboard summary view of the organization's information security compliance on an ongoing basis. Thus, user 105 can grant third parties' access to up-to-date information regarding an organization's compliance and risk.

Another aspect of the assessment program 400 is the ability to incorporate external audit results. Assessment program 400 provides a mechanism to record any external audit events and their results against a given standard's individual tests or checks. For example, if a standard call for a certain policy to be present in an organization's information security program, and an audit determines this policy is or is not in compliance to the standard, the compliance result can be recorded with the policy's record in the tool's assessment and document library records. Multiple results can be tracked over time against each standard. Audit results will leverage proactive standards cross-mapping (see above) to cross-reference and display associative audit results across standards. Thus, audit results can be tracked within the tool, providing the organization the ability to track its compliance against external audit activities with historical reference.

Another aspect of the assessment program 400 is the ability to incorporate external testing results. Ingest and track external tool results, such as those from automated testing tools, custom software, or structured report results from third-party tools (e.g., spreadsheets, XML, CSV, etc.), providing a single source to track compliance with standards. For example, an organization may develop software which is subject to a standard; on each test of the software, results are generated which directly or indirectly correlate to a standard. These results can be ingested (e.g. imported through file uploads, directly uploaded into the tool through APIs, etc.) and recorded with the associated standard. Results are tracked over time, providing a complete history of when a part of the standard was tested (in this example, when the software is tested) and the result of that test respective to the standard. Results ingested will leverage proactive standards cross-mapping (see above) to cross-reference and record associated results across standards. Thus, the program provides various mechanisms to record, over time and with history, automated tests and their results against the tools' standards.

Another aspect of the assessment program 400 is the ability to integrate with external testing tools. The ability to connect with and retrieve data from an external testing tool which contains information directly or indirectly applicable to a standard and its compliance. For example, public cloud providers such as AWS and Azure provide several tools which collect information about the compliance of a given customer's utilization within the cloud provider. The program will be able to retrieve information from the public cloud provider and incorporate the information with the program's own records of the associated standard. Results are tracked over time, providing a complete history of when the external information was retrieved. Results retrieved will leverage proactive standards cross-mapping (see above) to cross-reference and record associated results across standards. Thus, the program provides various mechanisms to retrieve and record, over time and with history, external tools' results and information against the tools' standards.

Another aspect of the assessment program 400 is the ability to provide integration with external software build systems. The tool provides additional software (called the Automated Pipeline Harness Library) which may be utilized by various third-party external software build systems. The Automated Pipeline Harness Library provides a library of software tests easily incorporated into the software build processes. The Automated Pipeline Harness Library is a collection of tests evaluating software as to its correctness and adherence to standards provided by the program. This allows an organization to quickly, and with minimal effort, incorporate tests into its software build process to check if the software is following standards. The Automated Pipeline Harness Library may be distributed in various forms to support various third-party external software build systems (such as Jenkins, CircleCI, Bamboo, etc.) and in various programming languages (such as Java, Groovy, C#/.Net, Python, Golang, etc.). Thus, the program provides additional software to give an organization quick and easy standard testing as part of that organization's software build processes. It is to be further understood, that in an assessment to determine compliance with a standard or set of regulations, which includes assessment of software built using the Automated Pipeline Harness Library, portions of the assessment may be automated and results of the testing may be documented as a part of the assessment.

Figure 4:
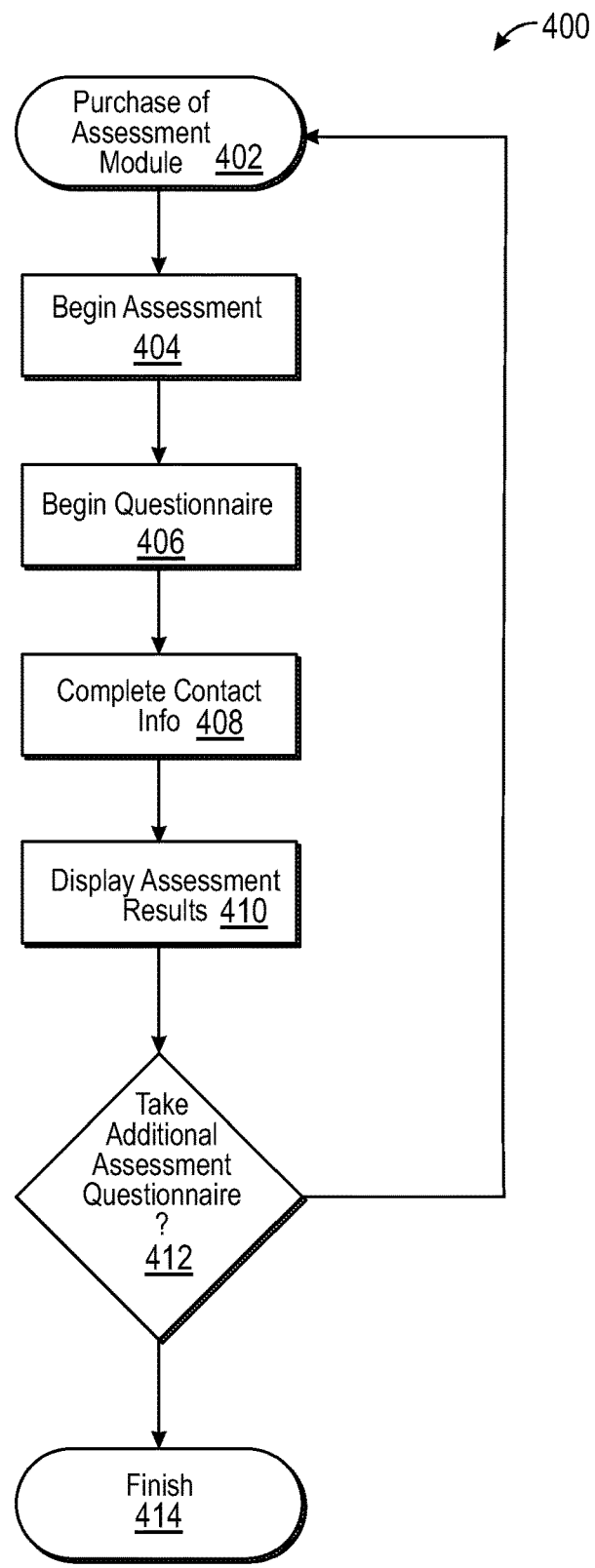
FIG. 4 is a flow chart of an assessment program in an embodiment of the present invention.

With reference to FIG. 4 a flow chart of an assessment program in an embodiment of the present invention is shown. With reference to assessment program 200, a user 105 would begin the process of determining their business' compliance with a specified regulatory or accepted standard by first purchasing one of many assessment modules at state 402. At state 404, user 105 can begin the assessment for whichever module was purchased. In the case of FIG. 3, the NIST Cybersecurity Framework module was purchased and the user 105 begins the assessment at state 404 by clicking upon "start assessment" button 312. As stated above, most any module can be chosen, such as NIST, PCI, HiTRUST, HIPAA, GDPR, COBIT, ITI and SOX without departing from the spirit of the invention. Further, any of these modules can be chosen after the current assessment is finished. At state 406, user 105 begins the first question of the maturity assessment navigator.

With reference to FIG. 5A through FIG. 5G an exemplary embodiment for a systems development page in an embodiment of the present invention is shown. At state 406, user 105 would begin answering a set of questions, an example of which is laid out in FIG. 5A through FIG. 5G. Each one of the questions is specifically laid out based upon the state of the standard upon which the module is based. Should any change occur to the standard, the questions are updated immediately upon the standard being changed. The questions are shown as multiple-choice questions. However, the inventors fully contemplate most any type of question form including true-false or even essay without departing from the spirit of the invention. In addition, it is to be understood that in some instances, the question and answer type may specify that information is provided through an automated process such as through acquiring data points for software which incorporates the Automated Pipeline Harness Library or through integration with external testing such as through use of APIs, webhooks, or otherwise.

At state 408, the user 105 is asked to fill out the contact information for the maturity assessment. The contact information serves several purposes. As shown in FIG. 6, the user 105 is asked for their name, company name, phone number, email address and a confirmation of their email address. This contact information can be used to (1) provide the user 105 with the results of the maturity assessment via email or other hardcopy form, (2) to provide the user with information regarding the purchase of additional maturity assessments based upon answers provided and (3) to provide a contact for updated standards and regulations information should and purchased standards module change.

With reference to FIG. 7 an exemplary embodiment of an Information Security Assessment Results page in an embodiment of the present invention is shown. At state 410, the results of the assessment are presented to the user 105. As can be seen, based upon the user's answers to the questions presented in FIG. 5A through FIG. 5G and shown in FIG. 8A through FIG. 8C, program 400 presents user 105 with an assessment of the maturity of the company's information security. With reference to FIG. 7 and FIG. 3, the assessment is broken down into five different categories. Identification of risks 314, Protection from threats 316, Detection of events 318, Response to events 320 and Recovery from events 322.

Program 400 completes an assessment and provides a grading scale 700 where a score of the results are given as a factor of satisfactory answers given out of a full satisfaction of the regulation and/or standard out of one hundred possibly points. As is seen from the example given in FIG. 7, user 105 got a perfect score on the company's implemented recovery processes; however, the company only scored a 67 on responding processes, a 51 on identification processes, a 50 on protection processes and a 48 on detection processes. Thus, assessment program 400 has informed user 105, while his current NIST compliance would survive an audit as far as recovery is concerned, user 105 would also be aware the current NIST compliance process is severally lacking in detection, protection, identification and response.

With reference to FIG. 8A through FIG. 8C exemplary embodiments of Assessment Questions Results pages in an embodiment of the present invention are shown. User 105 can view all the answers to the questions presented in FIG. 5A to FIG. 5G to determine if they were answered correctly.

User 105 can decide the company would like some assistance with their compliance efforts. User 105 can opt to call the inventors and/or click on "get in touch" button 702, which would initiate a conversation with a sales team which could assist user 105 in determining how their compliance process can be upgraded to an audit standard.

At state 412, user 105 can elect to purchase another assessment module which performs a maturity analysis for another regulation or compliance module. If user 105 elects not to purchase another regulation or compliance module, then program 400 proceeds to state 414 and the program 400 finishes. If user 105 would like to purchase additional regulation or compliance modules, program 200 returns to state 402 for a purchase of assessment module. However, unlike the first iterative process, program 400 retains the answers from the first iteration (FIGS. 8A-C) and applies these answers to any applicable questions in the next purchased module, as discussed in detail above.

Figure 9:
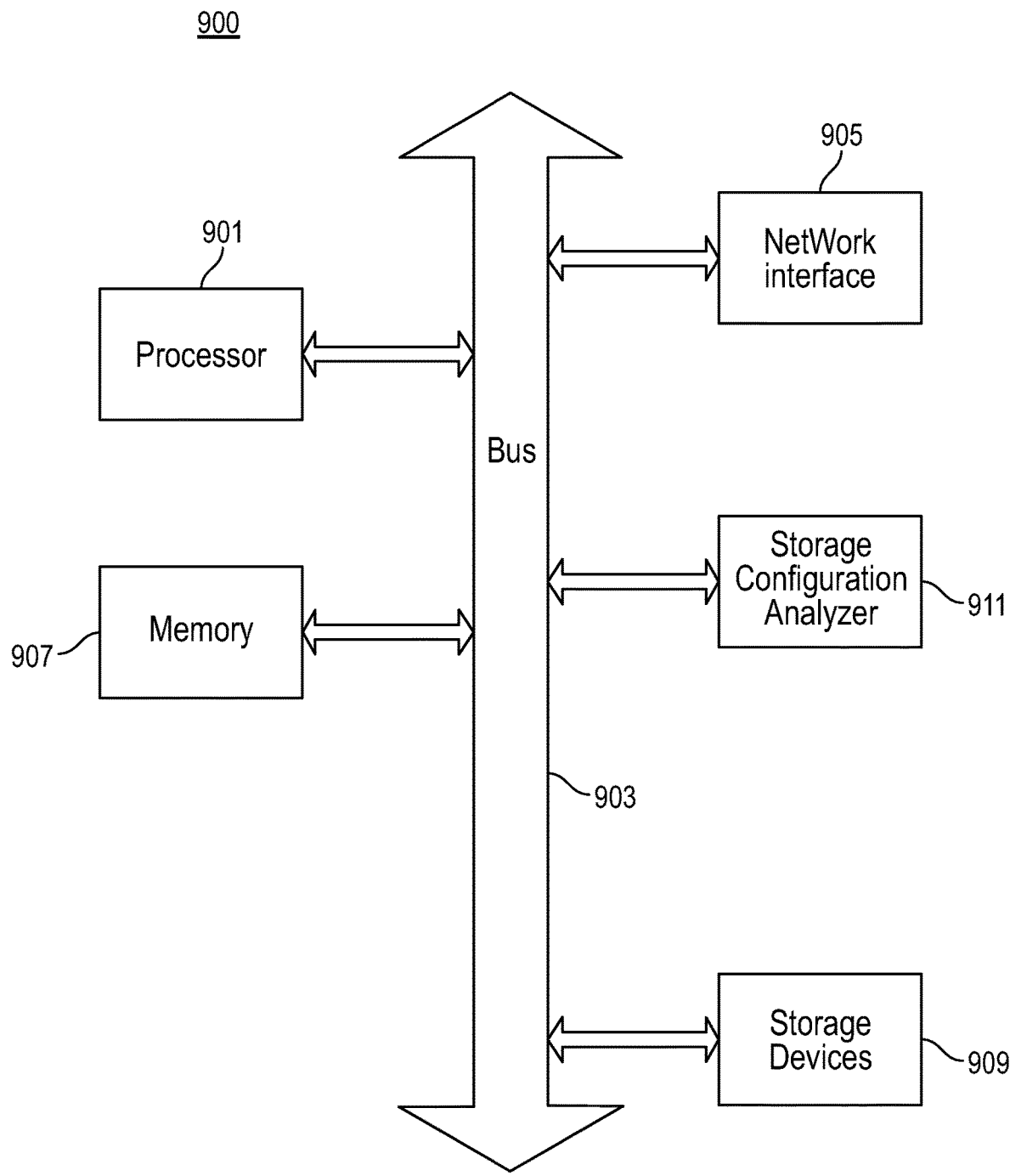
FIG. 9 depicts a computing system in accordance with an illustrative embodiment.

FIG. 9 depicts a computing system 900 in accordance with an illustrative embodiment. For example, the computing system 900 may represent an electronic computing or communications device, such as a desktop, laptop or most any computing station. The computing system 900 may communicate with system 100 or 200 or network 104. The computing device 900 may be utilized to receive user settings, instructions, or feedback. The computing system 900 includes a processor unit 901 (possibly including multiple processors, multiple cores, multiple nodes, and/or implementing multi-threading, etc.). The computing system includes memory 907. The memory 907 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media.

The computing system 900 also includes a bus 903 (e.g., PCI, ISA, PCI-Express, HyperTransport®, InfiniBand®, NuBus, etc.), a network interface 905 (e.g., an ATM interface, an Ethernet interface, a Frame Relay interface, SONET interface, wireless interface, etc.), and a storage device(s) 909 (e.g., optical storage, magnetic storage, etc.). The system memory 907 embodies functionality to implement embodiments described above. Code may be implemented in any of the other devices of the computing system 900. Any one of these functionalities may be partially (or entirely) implemented in hardware and/or on the processing unit 901. For example, the functionality may be implemented with an application specific integrated circuit, in logic implemented in the processing unit 901, in a co-processor on a peripheral device or card, etc. Further, realizations may include fewer or additional components not illustrated in FIG. 9 (e.g., video cards, audio cards, additional network interfaces, peripheral devices, etc.). The processor unit 901, the storage device(s) 909, and the network interface 905 are coupled to the bus 903. Although illustrated as being coupled to the bus 903, the memory 907 may be coupled to the processor unit 901.

Embodiments of the present invention can utilize AI (artificial intelligence) to enhance communication and abilities of users to interact through computing system 900. Artificial intelligence (also machine intelligence, MI) is intelligence demonstrated by machines, in contrast to the natural intelligence (NI) displayed by humans and other animals. In computer science AI is defined as the study of "intelligent agents": any device perceiving its environment and taking actions maximizing its chance of successfully achieving its goals. Colloquially, the term "artificial intelligence" is applied when a machine mimics "cognitive" functions humans associate with other human minds, such as "learning" and "problem solving".

Embodiments of the present invention can also record and monitor the participants to facilitate the assessment process. This can extend beyond digital communication based upon the AI interaction and monitoring of the system while activated (e.g., facial recognition for emotions, body language recognition for emotions, identification of swearing, etc.). Smart images, as an example, could be provided by the system and displayed on one or more of the various projection systems within it. Smart interaction of linked devices at remote sites could be made possible, like embodiments discussed above.

Figure 4A:
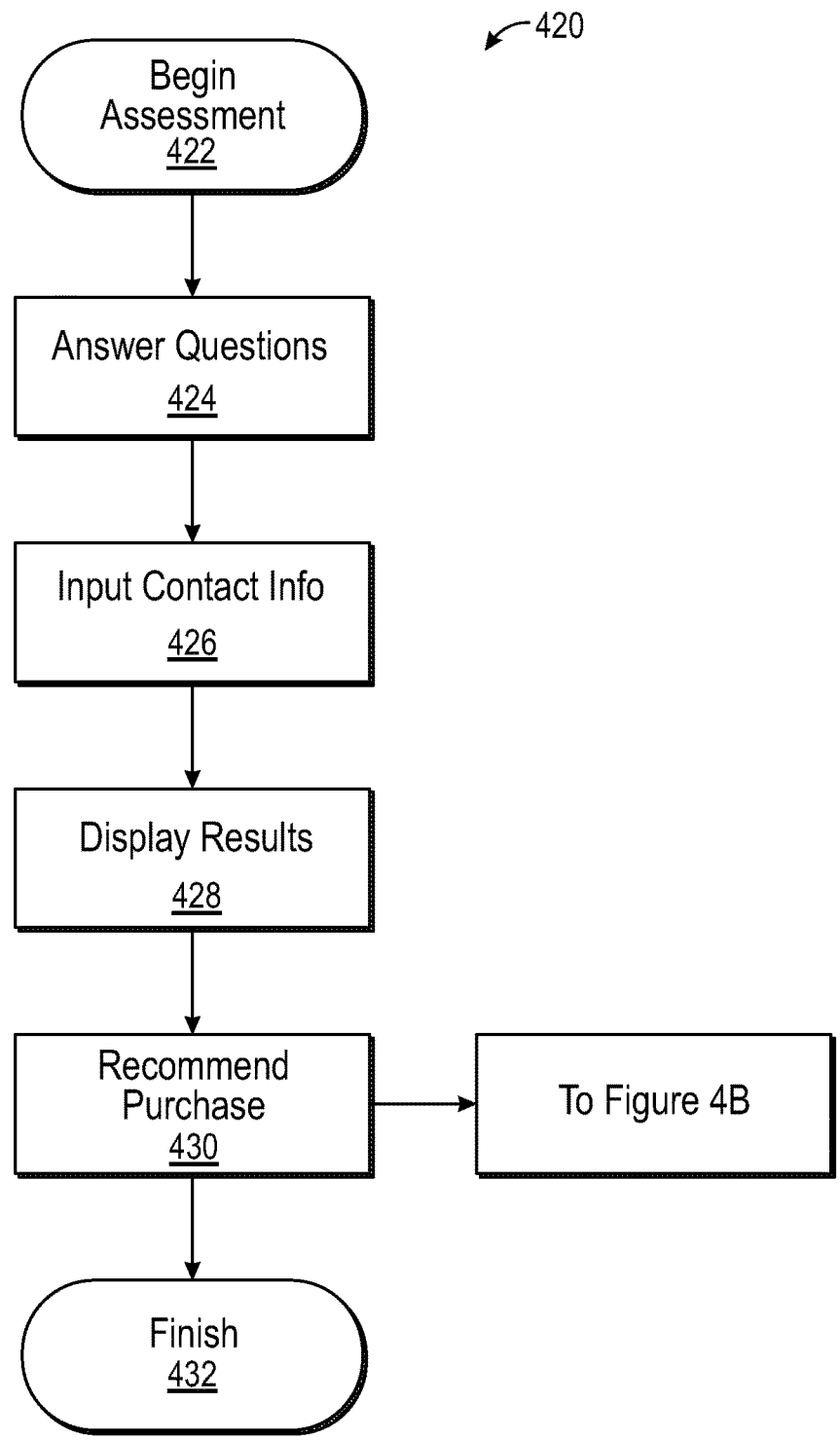
FIG. 4A is another flow chart of an assessment program in an embodiment of the present invention.

With reference to FIG. 4A, another flow chart of an assessment program in an embodiment of the present invention is shown. At state 422, assessment program 420 can begin assessment. User 105 to the Compliance Navigator public, free maturity assessment website 300 can be presented with a description of the maturity assessment process 420 and its outcomes. If the user 105 chooses to proceed and begin the assessment 420, program 420 moves on to state 424. User 105 then answers questions (state 424) presented to them. The questions may vary based on previous responses or other data (or metadata) known about the user 105. The questions are adjusted, in real time, to provide the best possible context and structure to gather more information and increase the accuracy of the assessment and provide higher value to the user 105.

At state 426, prior to receiving results, the user 105 is queried to identify themselves via contact information. This information is used to send a copy of the results in a durable, electronic format (such as email content, email attachment, etc.) and allows the user 105 to be contacted by sales personnel to provide additional help, guidance, etc. At state 428, the user 105 is shown the scoring of their assessment based on answers to previously presented questions in state 424 and any other data (or metadata) known about the user 105. Scoring may be accompanied by recommendations to change, improve, or otherwise adjust the user's self-reported scenario as gathered by the overall maturity assessment.

At state 430, the user 105 is presented with a list of recommended purchase options for further use with Compliance Navigator program 420. The recommendation for a purchase option is based on the answers to the previously answered questions and any other data (or metadata) known about the user 105.

Figure 4B:
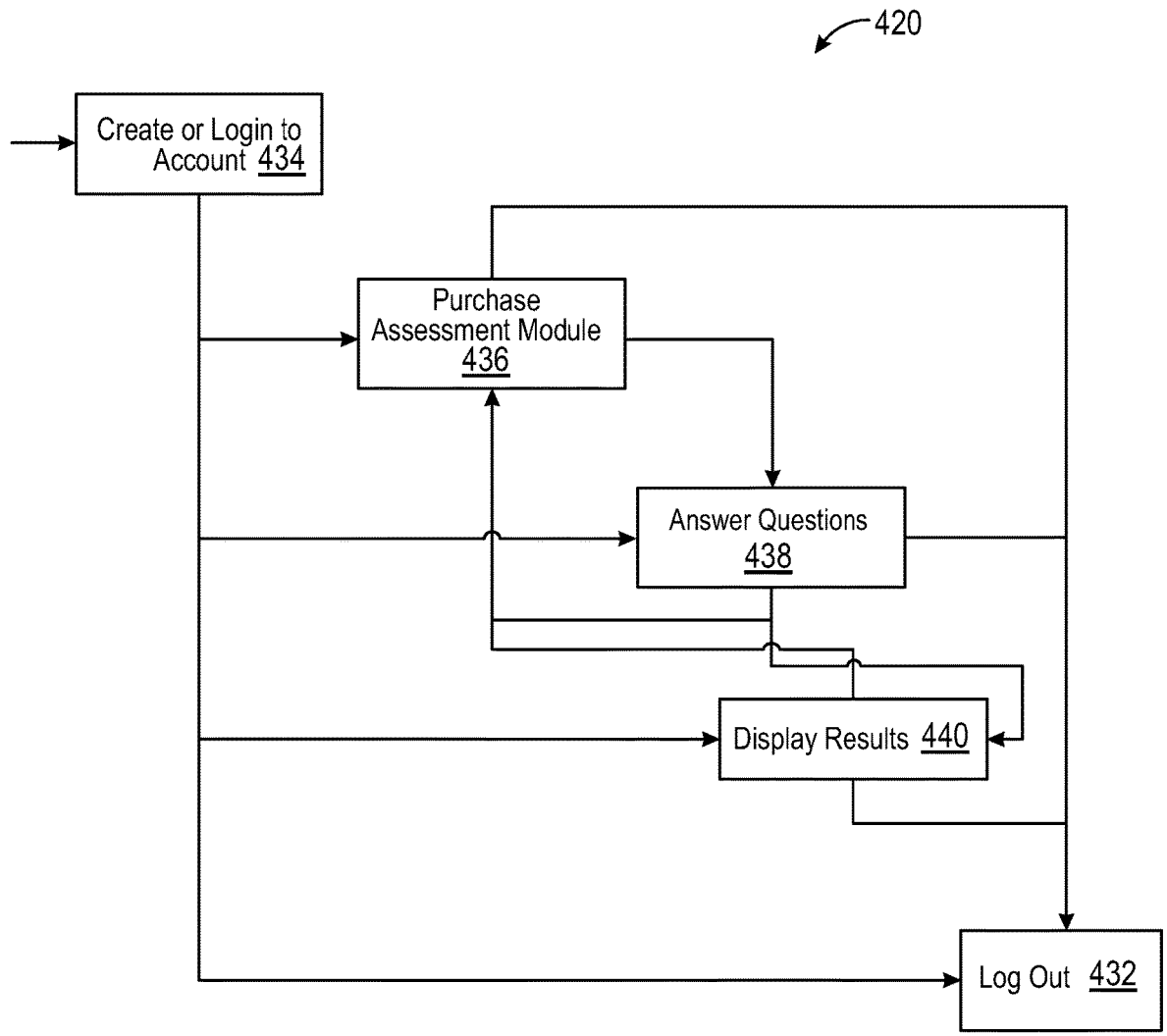
FIG. 4B is another flow chart of an assessment program in an embodiment of the present invention.

With reference to FIG. 4B, another flow chart of an assessment program in an embodiment of the present invention is shown. At state 434, program 420 allows a user 105 to register and create an account and establish account details or log in to an existing account using established credentials. Program 420 identifies and authenticates the user 105 as an existing customer. Once logged in through either process, the user 105 is now considered a customer. Once logged in, a customer may enter any of the areas of the system, which as displayed are currently PURCHASE ASSESSMENT MODULE (state 436), ANSWER QUESTIONS (state 438), DISPLAY RESULTS (state 440), and LOG OUT (state 432).

At state 436, based on how the user 105 arrived at this step, the user 105 is presented with system-chosen recommendations. If the user 105 arrived at this step via the free maturity assessment (FIG. 4A), the presented recommendations are the same, or similar, as shown at state 430. A user 105 may choose any assessment module and purchase it. At state 438, the user 105 may answer questions at their own pace. A user 105 may log out (leave the system at state 432) for any amount of time and return later to answer additional questions or change existing answers by logging in and resuming this step. Questions are presented based on data the system has about the user 105. For example, questions may be added or removed based on answers given to previously presented questions.

Questions may also be added or removed based on anticipated or calculated inferences made regarding questions' need for inclusion. For example, if a user 105 has purchased assessment module X, but not module Y, the system may determine, based on previously answered questions, module Y is of great value to the customer and add questions related to module Y. Thus, module Y can be offered for purchase later along with a determined preview of module Y's results and recommendations based on answers related to module Y.

At state 440, the user 105 may view results as soon as they have answered enough questions for results to be calculated. The number of questions required to provide results can depend on the module being assessed, the state of the regulation or law and other varying factors. The program 420 may determine results over a subset or small batch of questions or it may determine results over large groups of questions. The program 420 may calculate results in real-time for immediate display based on answers as they are input to the system 900 or it may calculate results in an asynchronous manner for display later from when answers are input to the system 900.

Results may be based on several internal processes not shown to the user 105, and may include numerical scores or other quantitative analysis, or by utilizing a qualitative analysis. Any and all data available to the system or external data to the system 900 may be utilized in preparing results via the system's internal processes.

Presentation of results may take multiple forms and formats. These can include graphs, charts, and other graphical and non-graphical textual displays of information, such as numerical and non-numerical information. Results may be presented in interactive formats, allowing customers to change, rearrange, or otherwise manipulate the presentation of information. Results may be exported from the system in various manners, such as interactive archives, static document formats, or other electronic interchange formats.

At state 432, the user 105 may opt to log out of the system (end their session) at any time. This function is available regardless of what area or step the user 105 is engaged at the time they choose to log out. Any information already input into the system will be saved prior to ending their session.

The present invention provides for integration with external testing tools. This may be in the form of managing or accessing data from external testing tools which interact with the system through application programming interfaces (APIs), webhooks, or otherwise. Where external testing tools are used, results from external testing may be used to collect proof or attestation of compliance with standards. For example, an external testing tool may be used to scan files on one or more company servers to search for unencrypted social security numbers. Results from the external testing tool may be stored in order to document and verify that no unencrypted social security numbers are stored. The results may be stored in various ways including as reports, screenshots, or otherwise. Thus, not only are a user's answers stored in response to questions within an assessment, but also the assessment may generate evidence in support of the response through integration with external testing tools. Examples of external testing tools include, without limitation, RSA Archer and ServiceNow. It is to be understood, however, that any number of other tools may be used which provide relevant results or reporting that provide evidence supporting attestations made in providing answers to assessments. It is to be understood, that not only does this aid in documenting compliance internally but may be helpful where the organization is being audited by an outside party. Other examples of external testing tools protect cloud and container environments from security threats, misconfigurations, policy violations, or other issues. One example of such a tool is Divvycloud, Thus, it is to be understood that any number of different types of external testing tools are contemplated.

The present invention further provides for an automated build pipeline harness. This aspect is useful where the organization performing the assessment develops software. Using the tools in the automated build pipeline harness provides an additional way to generate data points which may be used to document or evidence that software is in compliance with one or more standards. For example, one use of the automated build pipeline harness would be to assist in documenting software dependencies, allowing a record for all known software dependencies for a build of the software to be created. This list of dependencies may then be evaluated to determine if there are software dependencies present which have known vulnerabilities. Of course, by using software from the automated build pipeline harness may be used to generate data points for other types of vulnerability testing, penetration testing, compliance testing, or other purposes. Moreover, having the automated build pipeline harness integrated into software allows for an always up-to-date analysis of the software to determine whether there is compliance with one or more standards.

Figure 10:
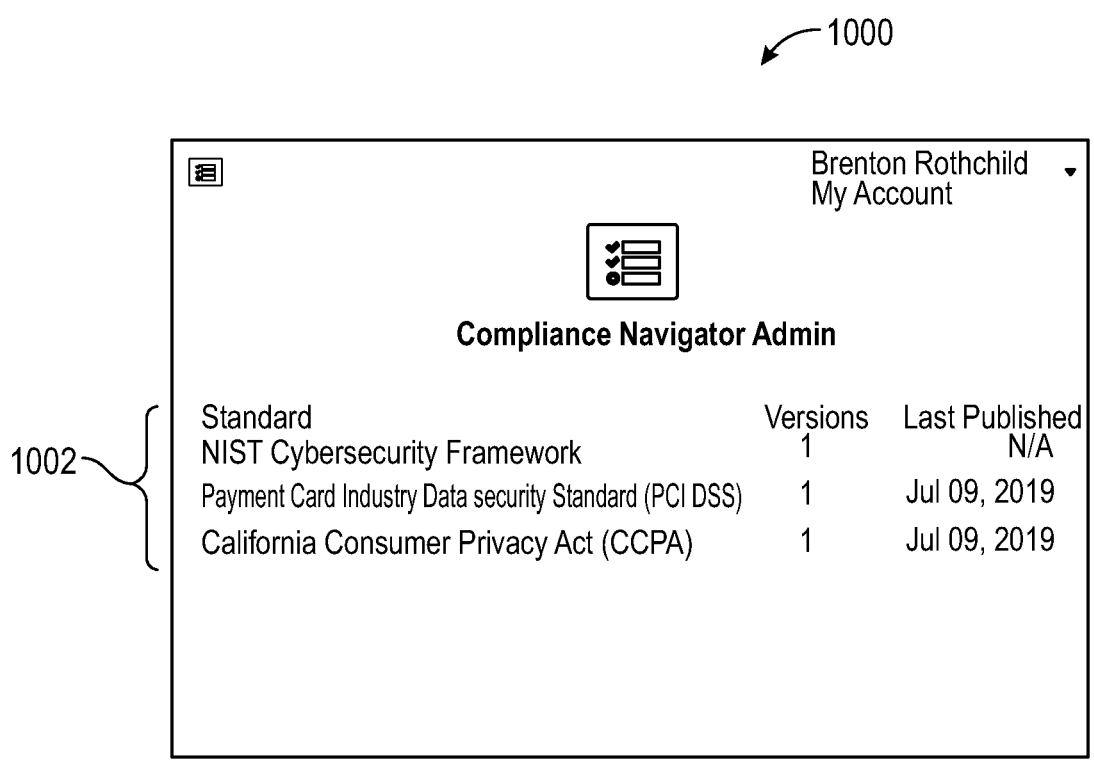
FIG. 10 is a screen display for an administrator which lists one or more standards.

FIG. 10 through FIG. 19 illustrate screen displays associated with a Compliance Navigator Administrative tool. As shown in FIG. 10, a screen display 1000 lists one or more standards 1002. In FIG. 10 the standards 1002 include an NIST Cybersecurity Framework Standard, a Payment Card Industry Data Security Standard (PCI DSS), and a California Consumer Privacy Act (CCPA) standard. The listing of standards may be a listing of current standards available for edit and publication, or to create new standards. A standard is not available to be utilized by the normal users of the Compliance Navigator system until it has been published. Administrators can choose when to publish a standard or can revoke a published standard. If a published standard is revoked, any existing work performed by normal users to provide answers to that standard's questions will be retained for audit purposes, but no longer retrievable by normal users.

Figure 11:
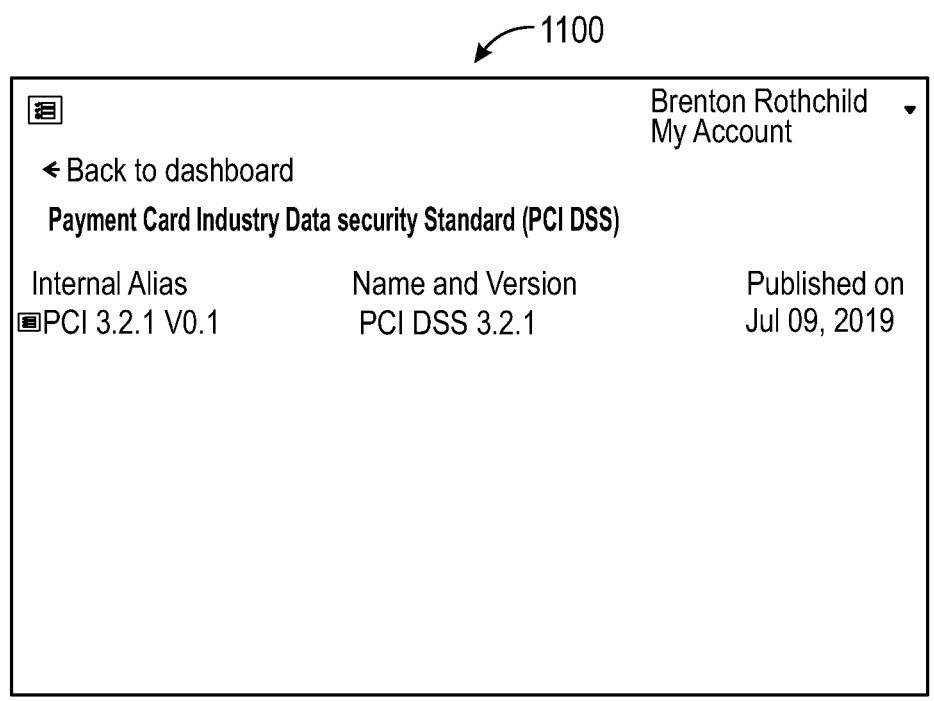
FIG. 11 is a screen display for an administrator showing available versions of standard and whether the version is published or not.

Once an administrator selects one of the standards 1002 in the screen display 1000 of FIG. 10, the administrator is then shown a screen display such as the screen display 1100 of FIG. 11. The screen display 1100 shows a listing of all available versions of a standard and which one is currently published (or "N/A" if not yet published for any version). Versions can be internally labeled according to a customer's needs (in screen display 1100, "PCI 3.2.1 v0.1" is the internal label). An unlimited number of versions can be maintained. Each version represents an edited set of the questions and possible answers comprising a standard. In one embodiment, once a version has been published, it cannot be modified; a new version must be created to perform any edits (changes, additions, or removals to questions or answers).

Figure 12:
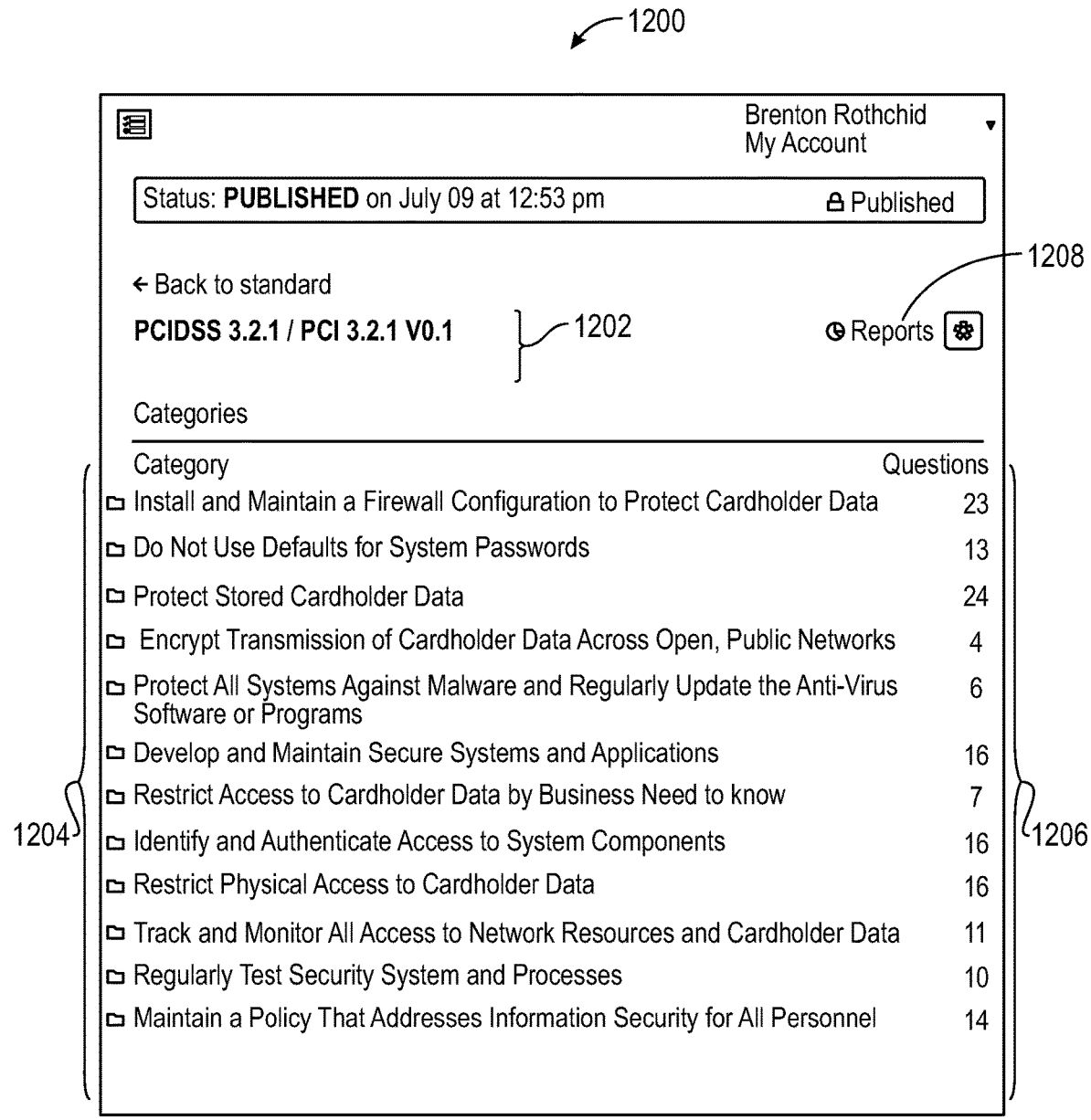
FIG. 12 is a screen display for an administrator showing a standard which has been selected so that the administrator can edit the questions and answer categories.

FIG. 12 is a screen display 1200 showing a standard 1202 which was selected. After choosing a version of a standard, an administrator can now edit the questions and answers' categories 1204. An unlimited number of categories can be maintained. Categories are input by the administrator as text. Each category may hold an unlimited number of questions 1206. Note that there is a Reports button 1208 here as well, with the reports shown in FIG. 16.

FIG. 13 illustrates a screen display 1300 which is an example of choosing an existing category. Once an existing category is selected, the administrator can then edit questions in that category. An unlimited number of questions may be maintained. Question text is input by the administrator.

Figure 14:
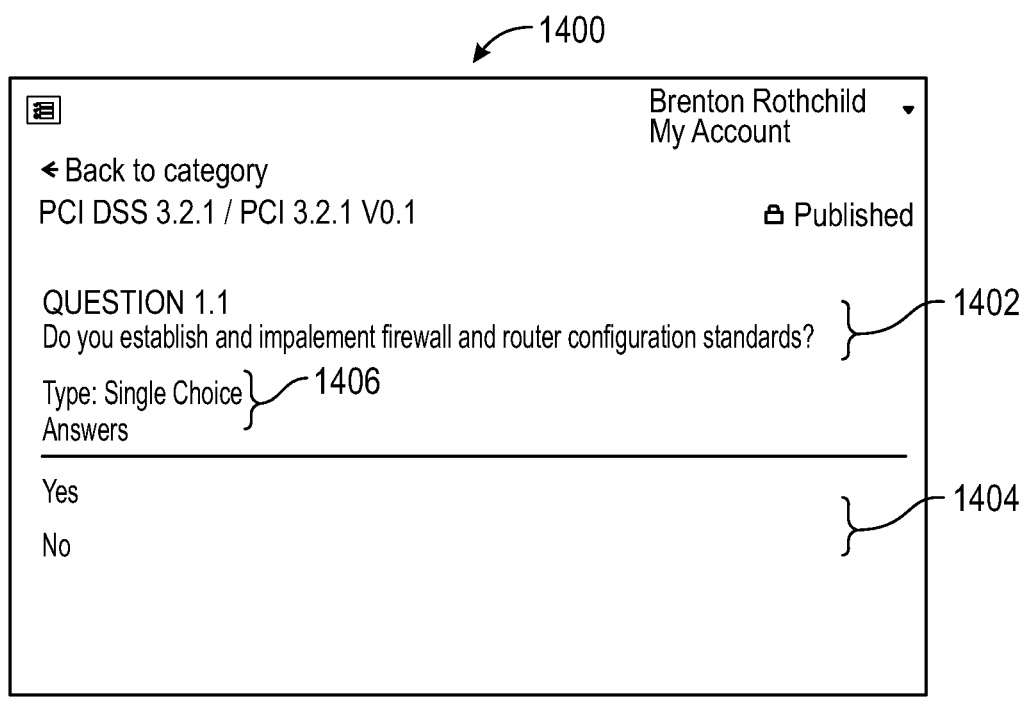
FIG. 14 is a screen display for an administrator which illustrates that after choosing an existing question, the administrator can then edit possible answers for that question.

FIG. 14 shows a screen display 1400 which illustrates that after choosing an existing question 1402, the administrator can then edit possible answers 1404 for that question. Answer text is input by the administrator. Questions are assigned a type 1406, indicating how they are presented to normal users during assessments (i.e. answering the questions). Question types include, without limitation, single-answer (wherein a single answer must be chosen from multiple choices), multiple-answer (wherein one or more of the presented choices may be selected), or text (wherein the answer may be free-form text). Question types may also allow for attachment of files to questions as well, in order to satisfy requirements to obtain attestation or proof of the state of a given answer (e.g. a screenshot from a database configuration showing encryption is enabled). In some embodiments, the attachments or answers may be provided through APIs or webhooks directly. In such instances, the user may be asked to configure the APIs or webhooks such as providing API key information or username and password information for accounts for other services. Thus, instead of answering the question directly, this information may be provided and the answers are obtained from connections to other services.

Figure 15:
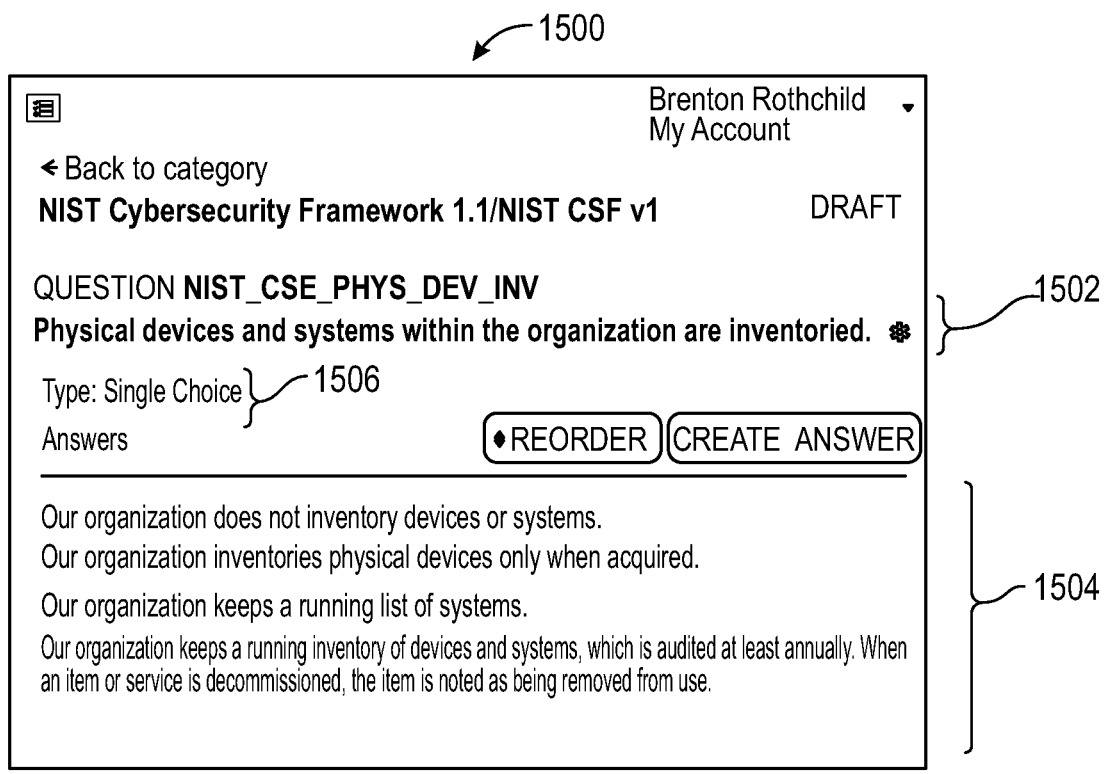
FIG. 15 is a screen display for an administrator without another example that after choosing an existing question, the administrator can then edit possible answers for that question.

FIG. 15 is another example of a screen display 1500 which illustrations that after choosing an existing question 1502, the administrator can then edit possible answers 1504 for that question. In this instance, multiple choices to a single-answer type question 1506.

Figure 16:
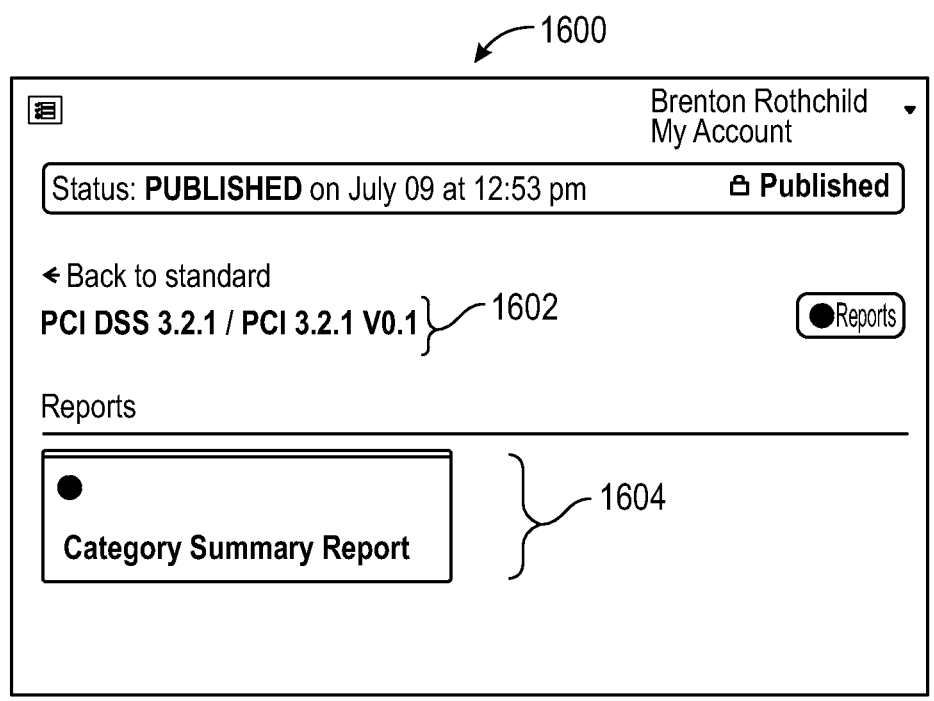
FIG. 16 is a screen display for an administer which allows the administer to configure available reports.

FIG. 16 is another example of a screen display 1600 which may be shown in response to having selected the "Reports" button from the category screen in FIG. 12. Here, the administrator can configure available reports 1604 for a given version of a standard 1602. In this example, a single choice to configure the available "Category Summary Report" is present.

After selecting the "Category Summary Report" in FIG. 16, a user may be shown the screen display 1700 of FIG. 17. Here, the administrator is able to see the list of categories list of categories as maintained in FIG. 12

FIG. 18 shows a screen display 1800. After choosing a category, the administrator is able to see a list of questions 1802 in that category.

FIG. 19 shows a screen display 1900. After choosing a question, the administrator is able to review and edit scoring 1902 for the available answers to that question. Scoring is presented here as a positive integer value between 0-100 (inclusive). For this report type, the cumulative questions' answers are scored on a maximum score basis per category and per-report.

For example, given a category Z with two questions X and Y, where question X has two answers worth 0 and 5, and question Y has to answers worth 0 and 5, then the scoring is a maximum of 10 points for that category. If question X's answer is chosen to be 0, and Y is chosen to be 5, then the score is 5 out of a possible 10.

This process may then be repeated for all categories. All categories may then be similarly summed to create an assessment-wide score. Scoring for this report is presented in percentage basis, although this can be customized for each report to show point totals or additional different scoring rubrics.

The invention is not to be limited to the embodiments described herein. In particular, the invention contemplates numerous variations. The foregoing description has been presented for purposes of illustration and description. It is not intended to be an exhaustive list or limit any of the invention to the precise forms disclosed. It is contemplated other alternatives or exemplary aspects are considered included in the invention. The description is merely examples of embodiments, processes or methods of the invention. It is understood any other modifications, substitutions, and/or additions can be made, which are within the intended spirit and scope of the invention.

What is claimed is:

1. A method for performing an online assessment of compliance with a first standard selected from a set of standards, each of the standards associated with cyber-security risk and information security risk, the method, comprising steps of:
    cross-mapping answers from the first standard selected from the set of standards with answers from one or more other standards within the set of standards;
    determining, using a processor executing software instructions, a plurality of assessment questions to ask the user, each of the plurality of assessment questions associated with the first standard and by reducing the plurality of assessment questions associated with the first standard based on the cross-mapping of the answers from the first standard selected from the set of standards with one or more of the other standards within the set of standards wherein answers have already been provided for assessment questions associated with the one or more of the other standards;
    presenting the plurality of assessment questions to the user through a user interface by executing the assessment module on the processor, each of the plurality of assessment questions associated with the first standard;
    assessing answers to the plurality of assessment questions using the assessment module executing on the processor to generate results of the online assessment;
    receiving over a network data points from a software application associated with the assessment, wherein the software application incorporates software code from an automated build pipeline harness which provides the data points and wherein the data points are associated with one or more of the answers to the plurality of assessment questions; and
    displaying the results of the assessment to the user using a display associated with the user interface.

2. The method of claim 1 further comprising accessing over a network results of an external testing tool and storing the results from the external testing tool in association with one or more of the answers to the plurality of assessment questions.

3. The method of claim 2 wherein the accessing is performed using an application program interface (API).

4. The method of claim 2 wherein the accessing is performed using a webhook.

5. The method of claim 1 wherein the assessment module is further configured to assess the data points along with the answers to generate the results of the online assessment.

6. The method of claim 1, wherein the first standard comprises one of a National Institute of Standards and Technology (NIST) standard, a Payment Card Industry (PCI) standard, a Health Information Trust Alliance (HiTRUST) standard, a Health Insurance Portability and Accountability Act (HIPAA) standard, a General Data Protection Regulation (GDPR) standard, a Control Objectives for Information and Related Technology (COBIT) standard, an IT Infrastructure Library (ITIL) standard, and a Sarbanes-Oxley Act (SOX) standard.

7. A system, comprising:
    a processor executing software instructions defining a compliance navigator for determining compliance with one or more standards associated with cyber-security risk or information security risk;

a network operably coupled to the processor capable of connecting to a computing device of a user also on the network; and a memory operably coupled to the processor for storing the compliance navigator software, the compliance navigator software comprising a content management system, at least one assessment module, an access control module, an audit module, and an automated testing module;

wherein the processor generates a web-based interface allowing the user to interact with the compliance navigator software;

wherein the user is asked a series of questions by the compliance navigator software;

wherein the answers to the questions presented are analyzed by the compliance navigator software to determine if the user is following a first compliance standard;

wherein the compliance navigator software is adapted to cross map answers given for the first compliance standard to a second compliance standard;

wherein the automated testing module provides for interfacing with an external computing system performing testing and updating one or more answers of an assessment with results obtained from the external computing system;

wherein the external computing system performing the testing provides for sending over a network data points from a software application associated with the assessment, wherein the software application incorporates software code from an automated build pipeline harness which provides the data points and wherein the data points are associated with one or more of the answers to the plurality of assessment questions to assist in determining if the user is following the first compliance standard and the second compliance standard.

8. The system of claim 7 wherein the compliance standard comprises at least one of a National Institute of Standards and Technology (NIST) standard, a Payment Card Industry (PCI) standard, a Health Information Trust Alliance (HiTRUST) standard, a Health Insurance Portability and Accountability Act (HIPAA) standard, a General Data Protection Regulation (GDPR) standard, a Control Objectives for Information and Related Technology (COBIT) standard, an IT Infrastructure Library (ITIL) standard, and a Sarbanes-Oxley Act (SOX) standard.

9. A method of performing an online assessment of compliance with cyber-security risk and information security risk standards, comprising the steps of:

providing access to a user to a compliance navigator software tool, the compliance navigator software tool comprising a content management system, an assessment module, an access control module, an audit module, and an automated testing module;

presenting a plurality of assessment questions to the user by executing the assessment module;

assessing answers to the plurality of assessment questions using the assessment module, the assessment module comprising machine-readable instructions stored on the non-transitory machine-readable storage medium; and displaying results of the assessment to the user;

cross mapping answers directed to a first information security assessment to a second information security assessment;

wherein the automated testing module is configured for accessing results from at least one external computing system and updating one or more answers associated with the questions of the assessment module with the results;

wherein the automated testing module provides for obtaining data points from software built with an automated pipeline harness library and using the data points in providing answers to one or more of the assessment questions.

10. The method of claim 9 wherein the at least one external computing system is accessed via at least one of an application program interface and a webhook.

* * * * *